United States Patent [19]

Watanabe et al.

[11] Patent Number: 5,005,052
[45] Date of Patent: Apr. 2, 1991

[54] IMAGE FORMING APPARATUS HAVING VERTICALLY MOVABLE ORIGINAL COVER

[75] Inventors: Junji Watanabe, Yokohama; Yuji Ishikawa, Tokyo, both of Japan

[73] Assignee: Kabushiki Kaisha Toshiba, Kawasaki, Japan

[21] Appl. No.: 286,885

[22] Filed: Dec. 20, 1988

[30] Foreign Application Priority Data

Dec. 24, 1987 [JP] Japan .................. 62-325356
Dec. 24, 1987 [JP] Japan .................. 62-325358
Dec. 28, 1987 [JP] Japan .................. 62-330067

[51] Int. Cl.$^5$ ............................ G03G 21/00
[52] U.S. Cl. ............................ 355/231; 355/75; 355/318; 355/321; 355/322
[58] Field of Search ............ 355/230, 231, 75, 317, 355/318, 321, 322, 320, 319; 271/186; 358/498

[56] References Cited

U.S. PATENT DOCUMENTS

| | | | |
|---|---|---|---|
| 3,623,806 | 11/1971 | Short | 355/317 |
| 4,043,665 | 8/1977 | Caldwell | 355/317 X |
| 4,264,187 | 4/1981 | Rhodes, Jr. | 355/319 X |
| 4,411,517 | 10/1983 | Gerkin | 355/318 |

FOREIGN PATENT DOCUMENTS

| | | | |
|---|---|---|---|
| 0027251 | 2/1982 | Japan | 355/75 |
| 0023058 | 1/1986 | Japan | 271/186 |
| 0084638 | 4/1986 | Japan | 355/75 |

Primary Examiner—A. T. Grimley
Assistant Examiner—Robert Beatty
Attorney, Agent, or Firm—Foley & Lardner

[57] ABSTRACT

An image forming apparatus includes a main body having an original table surface on which an original is to be placed, and an automatic original feeder. The feeder has an original cover located to oppose the original table surface and vertically movable between a lower position where the original cover contacts with the original table surface and an upper portiion where the original cover is separated from the original table surface. When an original is to be fed between the table surface and the original cover or discharged from between the table surface and the original cover by a feeding mechanism, the original cover is moved to its upper position. When the original on the table surface is to be scanned by an exposing device in the main body, the original cover is moved to its lower position so as to press the original against the table surface.

2 Claims, 21 Drawing Sheets

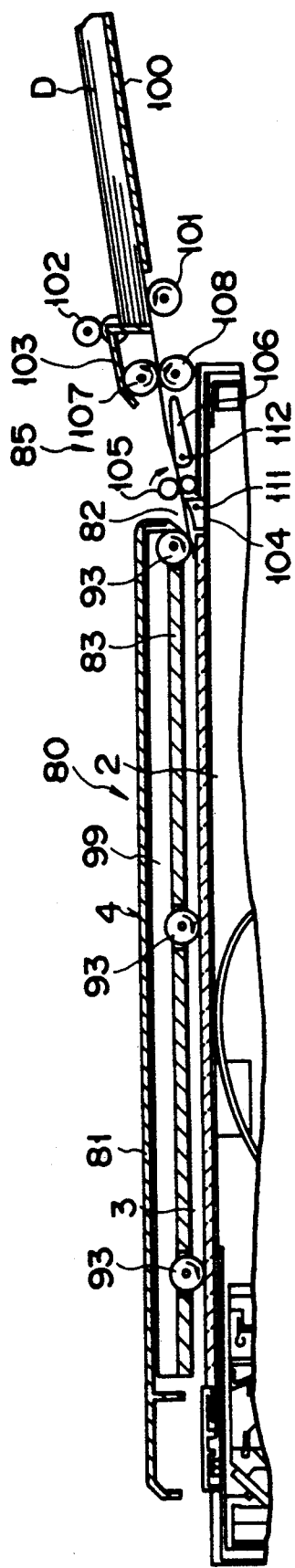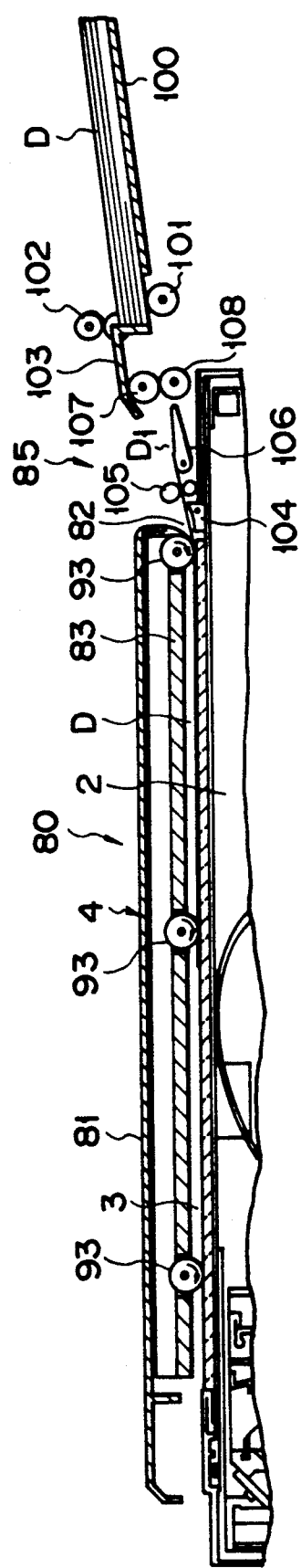

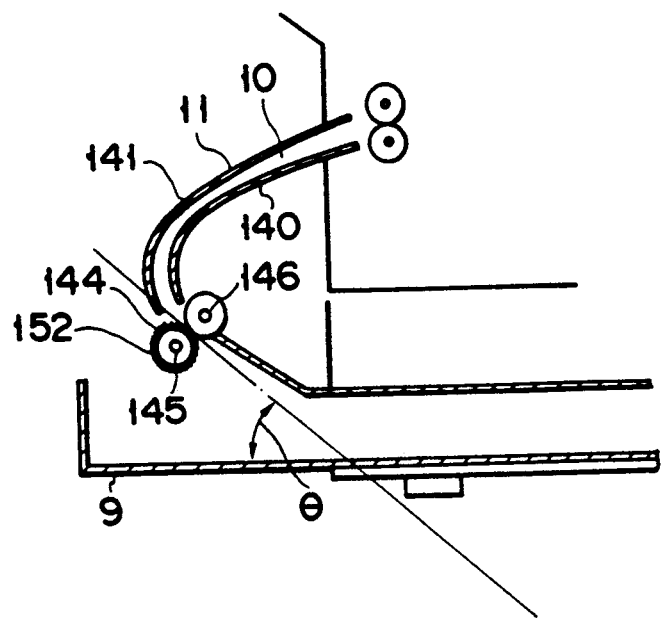
F I G. 22
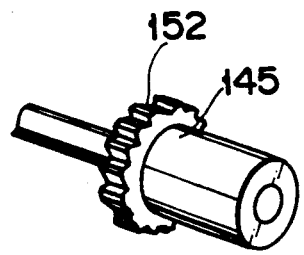
F I G. 23

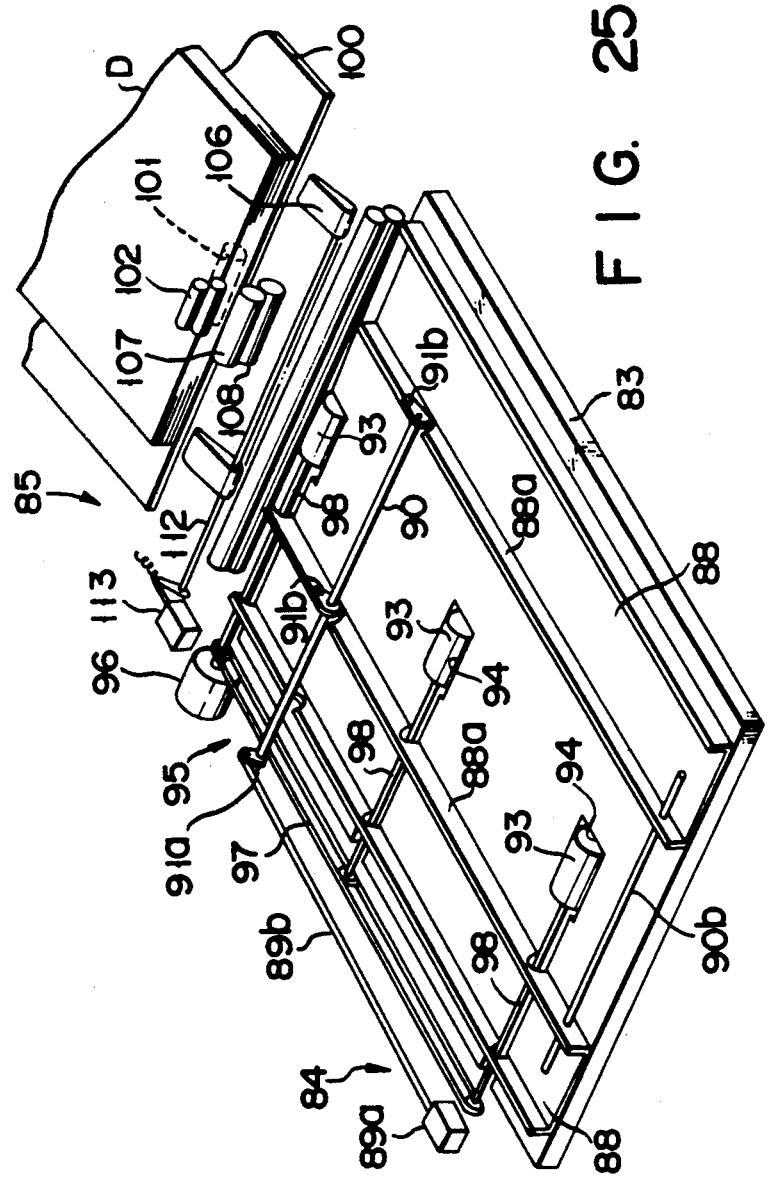
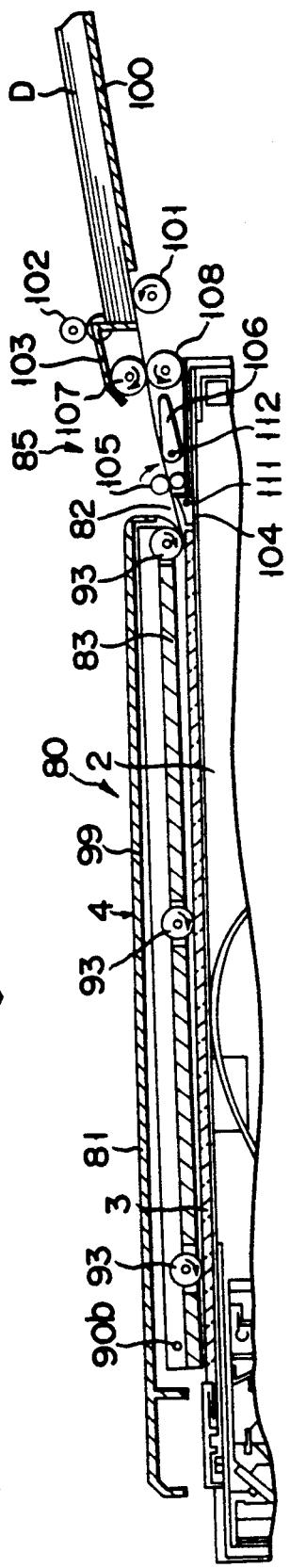
FIG. 25
FIG. 26

IMAGE FORMING APPARATUS HAVING VERTICALLY MOVABLE ORIGINAL COVER

BACKGROUND OF THE INVENTION

1. Field of the Invention

The present invention relates to an image forming apparatus such as an electronic copying machine and, more particularly, to an image forming apparatus having an automatic original feed/discharge unit.

2. Description of the Related Art

For example, a conventional plain paper copier copying machine includes an original table surface (normally a glass platen) and an exposing means for scanning an original on the original table surface. A main body of the PPC copying machine incorporates image forming process means for charging, exposure, development, cleaning, fixing, and the like. Various types of conventional copying machines each having automatic original feed/discharge unit (i.e., an automatic document feeder) are commercially available. This original feed/discharge unit normally comprises a feed table for supporting originals prior to scanning, a discharge table for supporting the originals after scanning, and an original feeding means for feeding the originals one by one onto the original table surface and discharging the originals one by one onto the discharge table after scanning. An endless conveyor belt traveling while contacting with the original table surface is frequently used as the original feeding means. This endless conveyor belt also serves as a platen sheet for holding the original onto the original table surface. A new conveyor belt is white as a whole.

The conveyor belt must be arranged in a long conveying path from the feed table to the delivery table and must have a width large enough to cover the entire original table surface. For these reasons, in a conventional automatic feed/discharge unit, a considerably large endless belt and a large belt drive mechanism are required. The belt, the drive mechanism, and the like are housed in a unit cover which is pivotally mounted on a main body of the image forming apparatus. For this reason, the cover is large in size and heavy, and cannot be easily opened/closed. In addition, an implementation for stabilizing the travel state of the belt is required, resulting in high cost.

The belt is driven endlessly while slidably contacting with the original table surface and the adjacent members. For this reason, the belt drive mechanism must have a larger drive force. Even if the belt is white when it is new, the belt is easily contaminated in an initial period of use. When the belt is greatly contaminated, sharpness of the resultant image tends to be degraded.

SUMMARY OF THE INVENTION

The present invention has been made in consideration of the above situation, and has as its object to provide an image forming apparatus having an automatic original feed/discharge unit which is simple in construction as compared with a unit using an endless belt, and having an original press surface which is hard to contaminate.

In order to achieve the above object of the present invention, there is provided an image forming apparatus comprising: a main body having an original table surface on which an original is placed; exposing means, arranged inside the main body, for scanning the original placed on the original table surface; and an automatic original feed/discharge unit for feeding the original onto the original table surface and discharging the original from the original table surface after scanning. The unit comprises a plate-like original cover located to oppose the original table surface and arranged to be vertically movable between a lower position where the original cover is in contact with the original table surface and an upper position where the original cover is separated therefrom, and an original cover drive mechanism for moving the original cover to the upper position when the original is fed onto the original table surface and is discharged therefrom, and for moving the original cover to the lower position when the original placed on the original table surface is scanned.

With the above arrangement, when the original is fed to the original table surface, the original cover is moved upward. After the original is placed on the original table surface, the original cover is moved downward. Therefore, the original can be pressed on the original table surface by the original cover. In this state, the original is scanned by the exposing means. After scanning is completed in this state, the original cover is moved upward again, and then the original is discharged from the original table surface.

BRIEF DESCRIPTION OF THE DRAWINGS

FIGS. 1 to 19 show an image forming apparatus according to a first embodiment of the present invention, in which FIG. 1 is a perspective view showing an outer appearance of the apparatus, FIG. 2 is a sectional view showing an internal construction of the apparatus, FIG. 3 is a perspective view of an automatic original feed/discharge unit, FIG. 4 is a sectional view of the unit taken along line IV—IV of FIG. 3, FIG. 5 is a perspective view showing a sheet discharge unit and a discharge tray, FIG. 6 is a perspective view of a stopper, FIG. 7 is a partially cutaway perspective view of the discharge tray, FIG. 8 is a sectional view taken along line VIII—VIII of FIG. 5, FIGS. 9A to 9C are sectional views showing original feed steps in the feed/discharge unit, FIG. 12 is a sectional view showing a state wherein an original cover of the feed/discharge unit is moved downward, FIG. 14 is a perspective view showing an original discharge step of the feed/discharge unit, FIG. 17 is a perspective view of the sheet discharge unit and the discharge tray in a state wherein the discharge tray is moved by a predetermined distance, FIG. 18 is a perspective view showing a sheet stacked state when the sheets are stacked thereon while the discharge tray is moved every predetermined cycle, and FIG. 19 is a perspective view showing a state wherein the discharge tray is pulled out from the main body of the apparatus;

FIGS. 21 to 24 show an image forming apparatus according to a second embodiment of the present invention, in which FIG. 21 is a perspective view showing a sheet discharge unit and a discharge tray, FIG. 22 is a sectional view of the discharge unit and the discharge tray, FIG. 23 is a perspective view of a discharge roller, and FIG. 24 is a sectional view showing a positional relationship between the discharge unit and a stopper; and FIGS. 25 and 26 show a modification of an automatic original feed/discharge unit, in which FIG. 25 is a perspective view of the unit, and FIG. 26 is a sectional view of the unit.

DETAILED DESCRIPTION OF THE PREFERRED EMBODIMENTS

Preferred embodiments of the present invention will be described in detail with reference to the accompanying drawings.

Figure 1:
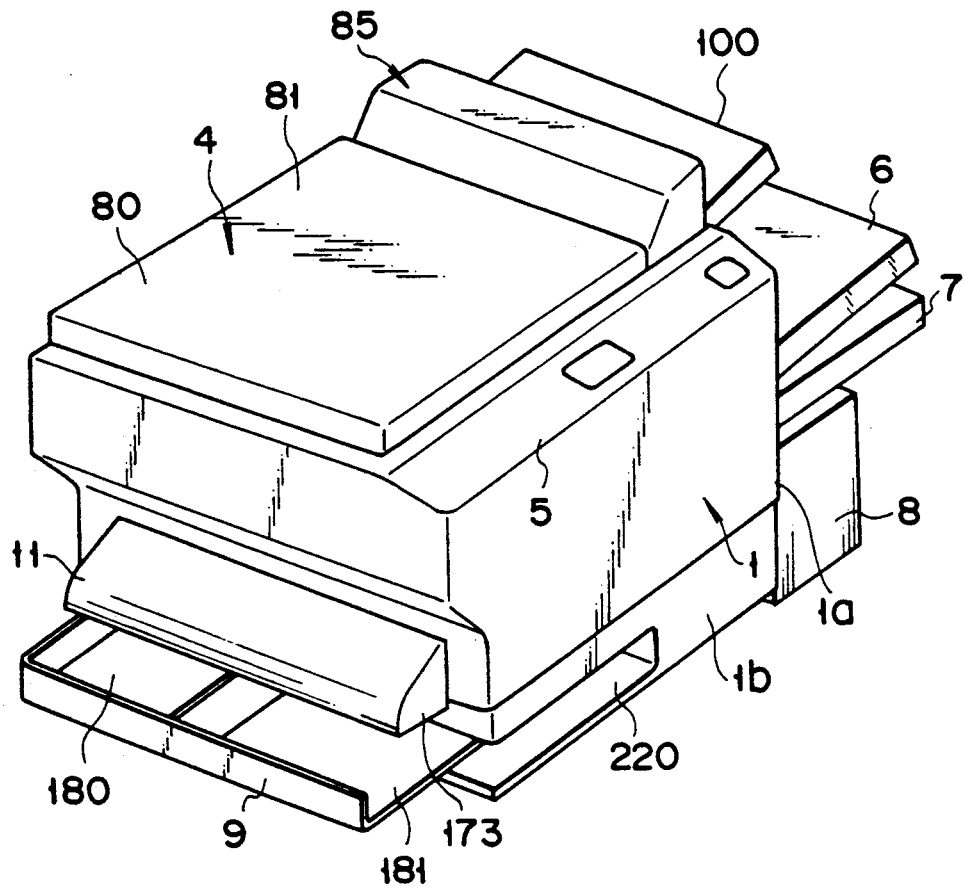
Figure 2:
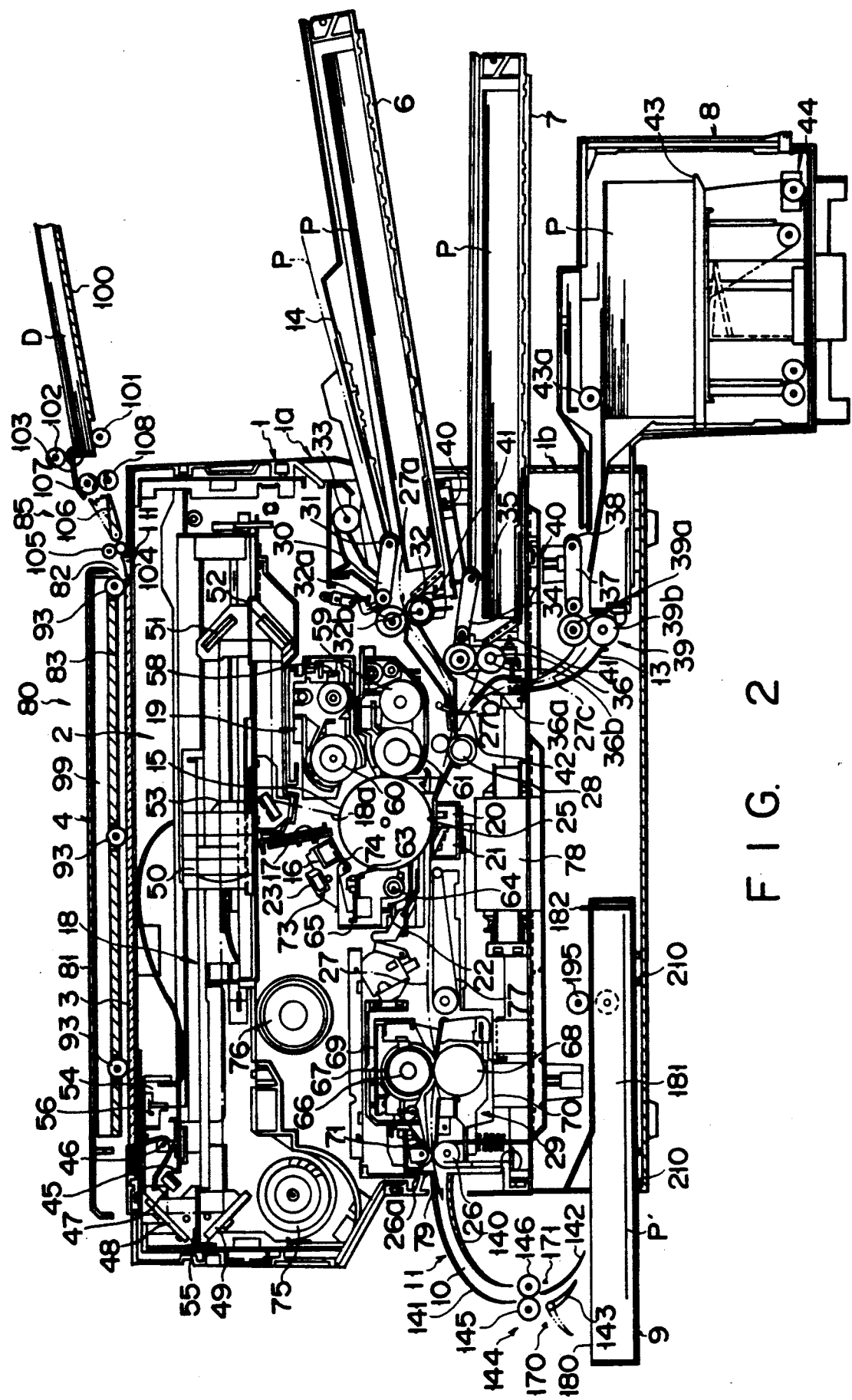

FIG. 1 schematically shows an outer appearance of a PPC copying machine as an arrangement of an image forming apparatus, and FIG. 2 shows an internal construction of the copying machine. The copying machine comprises main body 1 which incorporates image forming process means 2 for performing charging, exposure, development, transfer, cleaning, fixing and the like. Original table glass plate 3 serving as an original table surface is provided at the upper surface portion of main body 1. On the upper surface of main body 1 is arranged automatic original feed/discharge unit 4 for feeding original D onto glass plate 3 and discharging original D after scanning. Unit 4 will be described in detail later. Operation panel 5 is arranged at the front edge portion of the upper surface of main body 1. First paper cassette (to be referred to as an upper cassette hereinafter) 6, second paper cassette (to be referred to as a lower cassette hereinafter) 7, and large-capacity paper feed unit 8 are fitted to the right side of main body 1. Upper and lower cassettes 6 and 7 store sheets P such as normal sheets which are to be supplied to image forming process means 2. Discharge tray 9 for storing fixed sheets P' is attached to the left side of main unit 1. Sheet feed-out unit 11 having U-turn feed-out path 10 for guiding sheet P' (discharged from main body 1) to discharge tray 9 in a reversal state is also attached to the left side of main unit 1. Sheet P' which has passed through U-turn convey path 10 is discharged onto tray 9 which the surface is reversed, i.e., the image surface faces downward.

Main body 1 includes upper unit 1a and lower unit 1b. Upper unit 1a incorporates image forming process means 2. Upper and lower cassettes 6 and 7 and sheet feed-out unit 11 are attached to upper unit 1a. Discharge tray 9 and large-capacity sheet feed unit 8 are attached to lower unit 1b. Sheet guide 13 is arranged in unit 1b so as to guide sheet P from unit 8 into unit 1a. Manual feed table 14 is arranged above upper cassette 6.

Image forming process means 2 has the following arrangement. Photosensitive drum 15 serving as an image carrier is arranged at substantially the center of upper unit 1a. Charging unit 16, erasing unit 17, exposing unit 18a of exposing means 18, developing unit 19, transfer unit 20, separating unit 21, cleaning unit 22, discharging unit 23, and the like are arranged around drum 15 in a direction of rotation of drum 15.

At the inner bottom portion of upper unit 1a is formed sheet convey path 27 for guiding sheet P fed from cassette 6 or 7, feed unit 8, or feed table 14 to a pair of discharge rollers 26 through image transfer section 25. Image transfer section 25 is arranged between photosensitive drum 15 and transfer unit 20. Aligning rollers 28 are arranged on the upstream side of image transfer section 25, and fixing unit 29 is located on the downstream side thereof.

Sheet take-out roller 31 supported by swingable arm 30, separation convey means 32, and manual feed roller 33 are arranged inside upper unit 1a near the cassette mounting portion for upper cassette 6. Separation convey means 32 has convey roller 32a and separation roller 32b. Upon rotation of convey roller 32a, sheets P picked up from cassette 6 by roller 31 are fed one by one into first branch convey path 27a constituting the upstream side of sheet convey path 27. Manually fed sheet P is fed in first branch convey path 27a through a path between convey roller 32a and separation roller 32b separated therefrom, upon rotation of manual feed roller 33.

Sheet pickup roller 35 mounted on swingable arm 34 and separation convey means 36 are arranged in upper unit 1a near the cassette mounting portion for lower cassette 7. Separation convey means 36 has convey roller 36a and separation roller 36b. Sheets P picked up from cassette 7 by roller 35 are fed one by one into second branch convey path 27b by convey roller 36a.

Sheet pickup roller 38 mounted on swingable arm 37 and separation convey means 39 are arranged in lower unit 1b near the cassette mounting portion for large-capacity sheet feed unit 8. Separation convey means 39 comprises convey roller 39a and separation roller 39b. Sheets P picked up by sheet pickup roller 38 from unit 8 are fed one by one into third branch convey path 27c by convey roller 39a.

Switch 40 for detecting presence of sheets and switch 41 for detecting cassette presence/absence and sheet size are arranged at each of the cassette mounting portions for upper and lower cassettes 6 and 7. A detection switch (not shown) for detecting the presence/absence of unit 8 is arranged at the cassette mounting portion for unit 8. Unit 8 is connected to main unit 1 through a signal cable (not shown) so as to exchange various signals therebetween. A sheet empty detection signal and the like are supplied from unit 8 to main body 1.

Sheet sensor 42 is arranged at a merged portion of branched convey paths 27a, 27b, and 27c, i.e., near the upstream side of aligning rollers 28, to detect sheet P conveyed through path 27a, 27b, or 27c.

Large-capacity sheet feed unit 8 includes elevator sheet feed table 43 capable of stacking sheets P thereon. Uppermost sheet P stacked on table 43 is picked up by pickup roller 43a and conveyed to a position opposite to pickup roller 38 arranged in main body 1. When a predetermined number of sheets P are picked up from table 43, a signal is supplied from a detector (not shown) to lifting mechanism 44 to move table 43 upward so that uppermost sheet P is always located at a position where it can be picked up by pickup roller 43a.

Exposing means 18 includes exposure lamp 46 surrounded by reflector 45. Exposure lamp 46 illuminates original D set on original table glass plate 3 from the under side thereof. Light reflected by the original surface is guided to lens 50 through first mirror 47, second mirror 48, and third mirror 49. Light transmitted through lens 50 is guided to exposure portion 18a on photosensitive drum 15 via fourth mirror 51, fifth mirror 52, and sixth mirror 53.

Reflector 45, exposure lamp 46, and first mirror 47 are mounted on first carriage 54 which is reciprocatable along the lower surface of glass plate 3. Second mirror 48 and third mirror 49 are mounted on second carriage 55 which is moved at a speed half that of first carriage 54 in the same direction as that of first carriage 54. When carriages 54 and 55 are moved from the left to the right in the state of FIG. 2, exposing means 18 scans original D set on glass plate 3 and performs slit exposure to form an image corresponding to original D on photosensitive drum 15. On first carriage 54 is mounted spot unit 56 for designating a specific area of original D when original D is to be copied with the specific area being erased.

Developing unit 19 comprises upper developing unit 58 for color development and lower developing unit 59 for black development. Units 58 and 59 have a magnetic brush-type structure with developing rollers 60 and 61. Developing rollers 60 and 61 are selectively rotated with being located near photosensitive drum 15, thereby selectively performing black development or development of another color such as red.

Cleaning unit 22 includes cleaning blade 63 which brings into contact with photosensitive drum 15 to scrape the developing agent (toner) left on drum 15. The removed developing agent (toner) is discharged from casing 65 through auger 64 and is collected into a recovery box (not shown).

Fixing unit 29 comprises roller 67 having heater lamp 66 therein, and press roller 68 always urged against roller 67. These rollers are surrounded by upper and lower casings 69 and 70. Sheet discharge rollers 26 and discharge switch 71 are incorporated in casings 69 and 70.

Charging unit 16, transfer unit 20, and separating unit 21 utilize corona discharge, respectively. Deelectrifying unit 23 causes deelectrifying lamp 73 to emit light on photosensitive drum 15 through green filter 74. Erasing unit 17 includes a large number of LEDs arranged in the axial direction of photosensitive drum 15. These LEDs are selectively turned on to remove a charge of that portion of drum 15 which corresponds to the area designated by spot unit 56.

Cooling fan 75 and sub/main motor 76 are arranged above fixing unit 29. Conveyor belt 77 constituting part of sheet convey path 27 is located between separating unit 21 and fixing unit 29. High-voltage transformer 78 is arranged below conveyor belt 77, i.e., at the bottom of upper unit 1a. Deelectrifying brush 79 is arranged on the downstream side of discharge rollers 26.

Automatic original feed/discharge unit 4 will be described in detail.

Figure 3:
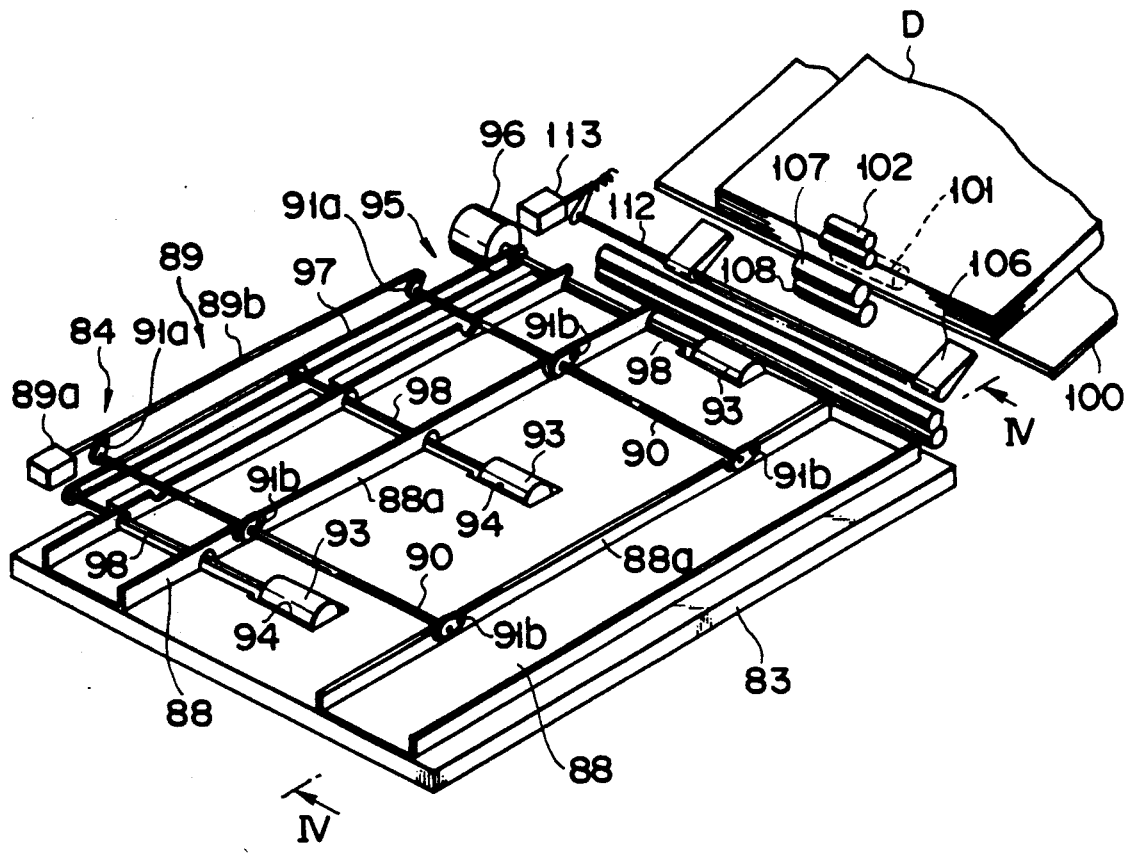

As is shown in FIGS. 1 to 3, unit 4 comprises unit body 80 located above original table glass plate 3, original table 100 arranged at the right side of unit body 80, and feed/discharge mechanism 85 for feeding original D to unit body 80 and discharging original D from the unit body onto the originals stacked on the original table.

Unit body 80 includes cover 81 mounted on the upper surface of main body 1 through a hinge (not shown). This cover is pivotal between a closed position where cover 81 covers glass plate 3 and an open position where the cover is removed from the upper surface of the glass plate. Original port 82 is formed in the right side wall of cover 81 and has a size which allows original D fed from mechanism to pass therethrough. Unit body 80 comprises rectangular platen sheet 83 serving as an original cover, sheet drive mechanism 84 for vertically moving sheet 83 in a manner to be described later, a plurality of feed rollers 93, and roller drive mechanism 95. These members are located on the lower surface side of cover 81, i.e., on the side facing glass plate 3 when the cover is closed, and can be pivoted integral with cover 81. Cover 81 is not illustrated in FIG. 3 for the sake of simplicity.

Figure 4:
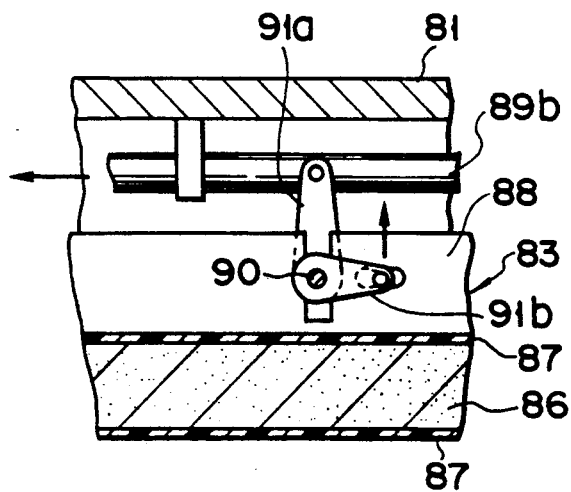

As is shown in FIGS. 3 and 4, platen sheet 83 comprises plate portion 86 formed of a relatively soft, light material such as a synthetic foamed material and sheet portions 87 made of a resin material and adhered to the upper and lower surfaces of plate portion 86. In particular, lower sheet portion 87 is white. A pair of reinforcing frames 88 are fixed on the upper surface of sheet 83 and extend in the feed direction of original D. Both edges of each frame 88 are bent upward to constitute bent portions 88a.

Sheet drive mechanism 84 comprises solenoid 89a and plunger 89b which serve as actuator 89, and a plurality of drive shafts 90. Solenoid 89a and plunger 89b are mounted on cover 81, and the plunger extends in the feed direction of original D. Each drive shaft 90 is rotatably supported by cover 81 and extends in a direction perpendicular to the feed direction of original D. Each drive shaft 90 is connected to plunger 89b through cam 91a and to bent portions 88a of each frame 88 through cams 91b. When solenoid 89a is energized while cover 81 is kept closed, plunger 89b is pulled in a direction of an arrow in FIG. 4, and cams 91b are rotated through cams 91a and drive shafts 90 in the direction indicated by an arrow in FIG. 4. Therefore, platen sheet 83 is moved upward and separated from original table glass plate 3. When solenoid 89a is deenergized, cams 91b are rotated in the direction opposite to the direction of the arrow. As a result, platen sheet 83 is moved downward and brought into surface contact with the upper surface of glass plate 3.

The plurality of feed rollers 93 are arranged to space apart from each other in the feed direction of original D. Each roller 93 is held in through hole 94 formed in platen sheet 83 and is located at the central position in the widthwise direction of sheet 83. Roller drive mechanism 95 includes a plurality of drive shafts 98 extending in a direction perpendicular to the feed direction of original D. One end of each shaft 98 is fixed to corresponding roller 93, and the other end thereof is connected to motor 96 through power transmission belt 97. Therefore, when motor 96 is driven to rotate shafts 98, rollers 93 can be rotated in the forward or reverse direction. Rollers 93 are arranged so as to contact with the upper surface of glass plate 3, when cover 81 is closed.

A plurality of feed rollers may be mounted on each drive shaft 98 and may be arranged in the widthwise direction of the original.

Feed/discharge mechanism 85 includes original pickup roller 101 for picking up the lowermost original from originals D stacked on original table 100, and feed and separation rollers 107 and 108 for clamping original D picked up from roller 101 and feeding it to unit body 80. Selection gate 106 registration rollers 105, and movable stopper 104 are arranged between rollers 107 and 108 and original port 82 in the order named. Furthermore, discharge rollers 102 are arranged above pickup roller 101. Guide 103 is arranged to surround the front and upper areas of feed roller 107. Rollers 101, 102, 105, 107, and 108 are driven by drive means (not shown) in a predetermined direction. A guide (not shown) is arranged on table 100 so as to define a widthwise position of original D on the table in accordance with an original size.

Stopper 104 is rotatable about shaft 111 and is switched between a lower position (FIG. 11A) and an upper position (FIG. 11B) by an actuator such as a solenoid (not shown). In the lower position, the end face of stopper 104 is located below the upper surface of glass plate 3 so as to allow smooth movement of the original to be fed onto glass plate 3 or discharged from glass plate 3. However, when stopper 104 is switched to the upper position, the end face of stopper 104 is located above the upper surface of glass plate 3.

Figure 13A:
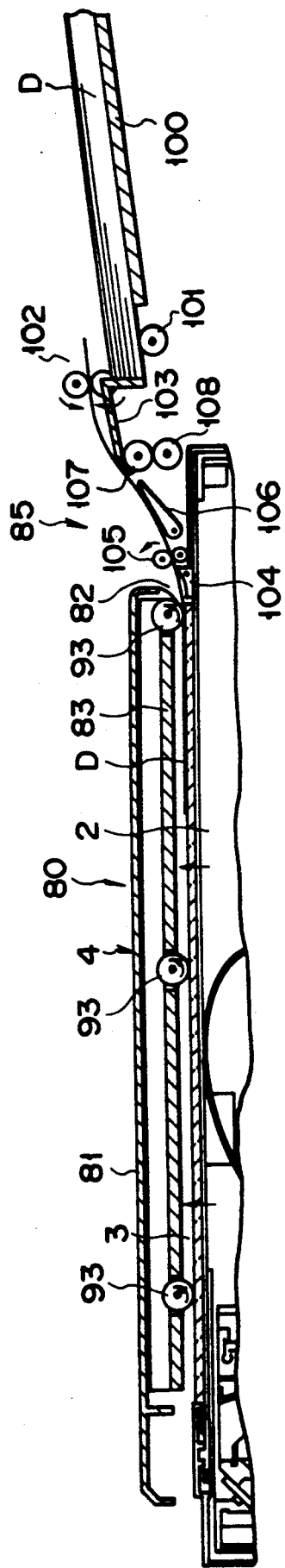
FIGS. 13A and 13B are sectional views showing original discharge steps in the feed/discharge unit.

Gates 106 are rotatable about shaft 112. As is shown in FIG. 3, gates 106 are switched by actuator 113 such as a solenoid between a lower position (FIG. 9A) and an upper position (FIG. 13A). In the lower position, gates 106 guide original D from original table 100 to registration rollers 105. In the upper position, gates 106 guide original D from glass plate 3 to discharge rollers 102.

The construction around sheet feed-out unit 11 and discharge tray 9 will be described.

Figure 5:
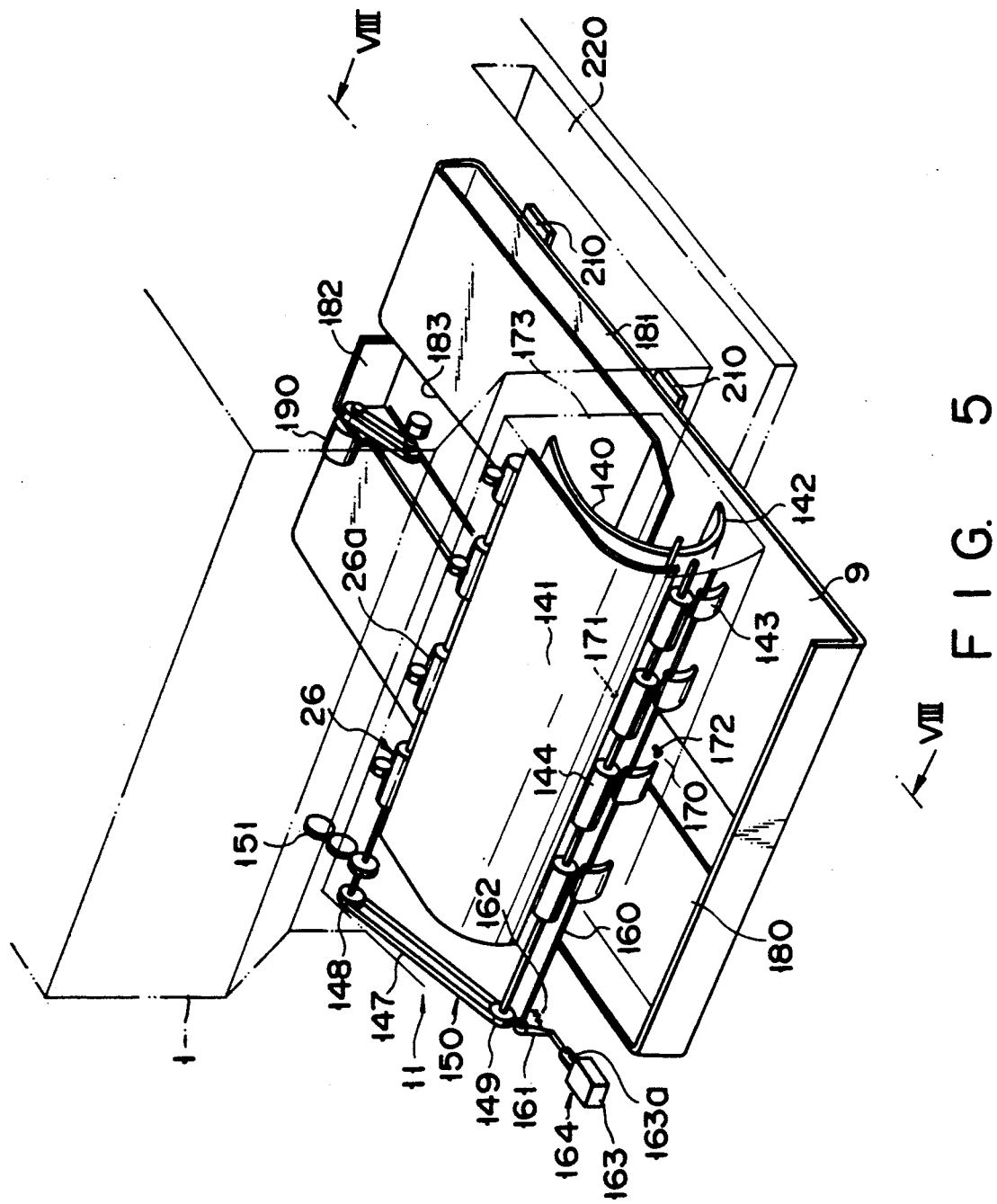

As is shown in FIGS. 2 and 5, feed-out unit 11 comprises first and second fixed guides 140 and 141 which extend outward from main body 1 near discharge rollers 26 while being curved downward and spaced apart from each other, arcuated third fixed guide 142 continuous with first fixed guide 140, and movable guides 143 continuous with second fixed guide 141 and spaced apart from third fixed guide 142. A space between first and second guides 140 and 141 and a space between third guide 142 and movable guides 143 constitute U-turn convey path 10 for guiding fixed sheet P′ discharged from main body 1 to discharge tray 9. Transfer means 144 is arranged between the extended ends of first and second guides 140 and 141 and the proximal ends of third guide 142 and moveable guide 143.

Transfer means 144 has drive rollers 145 and driven rollers 146 which are in rolling contact therewith. Drive roller 145 are interlocked with drive rollers 26a of discharge rollers 26 through power transmission system 150 including chain 147 and sprockets 148 and 149. Drive force of fixing unit 29 is transmitted to drive rollers 26a through gears 151.

Movable guides 143 are mounted on shaft 160 which is rotatably supported by bearings (not shown). Lever 161 is fixed to one end of shaft 160. Spring 162 for biasing lever 161 in a predetermined direction and plunger 163a of solenoid 163 for pulling lever 161 against the biasing force of spring 162 are coupled to lever 161. Spring 162, plunger 163a, and solenoid 163 constitute movable guide actuating means 164. In a deenergized state of solenoid 163, movable guides 143 are moved by the biasing force of spring 162 to a first position (position indicated by a solid line in FIG. 2) wherein they face third fixed guide 142. In the energized state of solenoid 163, movable guides 143 are moved by plunger 163a to a second position (position indicated by an alternate long and two short dashed line in FIG. 2) spaced apart from third fixed guide 142.

Detector 172 including light-emitting element 170 and light-receiving element 171 is arranged near movable guides 143. Detector 172 optically detects sheet P′ which passes through U-turn convey path 10.

Sheet feed-out unit 11 having the above construction is covered with cover 173 such that the drive unit and the like thereof are not exposed outside (FIG. 1).

Discharge tray 9 has a thin-profile box-like shape having first opening 180 at the left portion of the upper surface and second opening 181 on the front end face. Stopper 182 is incorporated in tray 9 so as to serve as a member for regulating the position of the leading ends of sheets P′ stacked therein.

Figure 6:
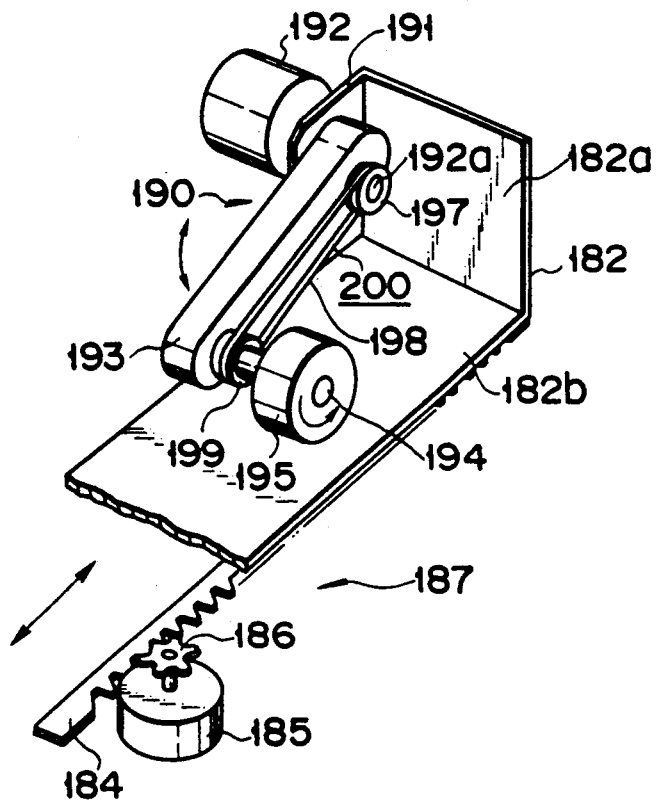

As is shown in FIGS. 5 and 6, stopper 182 is formed in a substantially L-shape and has vertical plate portion 182a serving as a leading end regulating surface and horizontal plate portion 182b parallel to the bottom surface of tray 9. Stopper 182 is nested in notch 183 formed in tray 9 and is held by a guide (not shown) to be slidable in the right-and-left direction in FIG. 2.

As is shown in FIG. 6, rack 184 is attached to the lower surface of horizontal plate portion 182b of stopper 182 and extends in a stopper moving direction. Pinion 186 mounted on a drive shaft of reversible motor 185 is meshed with rack 184. Motor 185 is supported by tray 9. Rack 184 and motor 185 constitute stopper moving means 187. Motor 185 is driven in accordance with a sheet size designation signal from operation panel 5, an original size detection signal from automatic original feed/discharge unit 4, or a sheet size signal on the basis of a slide position of the guide on manual feed table 14. Stopper 182 is automatically moved such that vertical plate portion 182a is located at a position suitable for the size of sheets to be stacked on tray 9.

Sheet feed mechanism 190 is mounted on stopper 182. Sheet feed mechanism 190 forcibly transfers sheet P′, which is fed in tray 9, until the leading end of sheet P′ abuts against vertical plate portion 182a. More detail, bracket 191 is integrally formed with the upper end of vertical plate portion 182a at that position which does not interfere positioning of sheet P′. Motor 192 is attached to drive shaft 192a extends bracket 191 while its drive shaft 192a extends through bracket 191. One end of swingable arm 193 is supported by drive shaft 192a so that arm 193 is swingable about shaft 192a. Feed roller 195 is mounted on the free end of arm 193 through rotating shaft 194. Roller 195 is driven by motor 192 through driving force transmission system 200 having pulley 197 fixed to drive shaft 192a, belt 198, and pulley 199 fixed to rotating shaft 194. Arm 193 is biased by a biasing member (not shown) to a position (position indicated by the solid line in FIG. 2) where feed roller 195 is moved outside tray 9. When motor 192 is driven, arm 193 is rotated against the biasing force of the biasing member so as to bring feed roller 195 into rolling contact with sheet P′ in tray 9.

Figure 8:
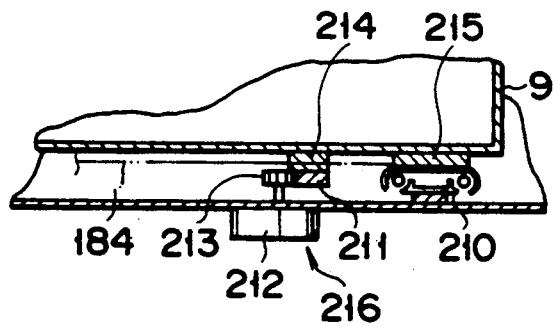
Figure 7:
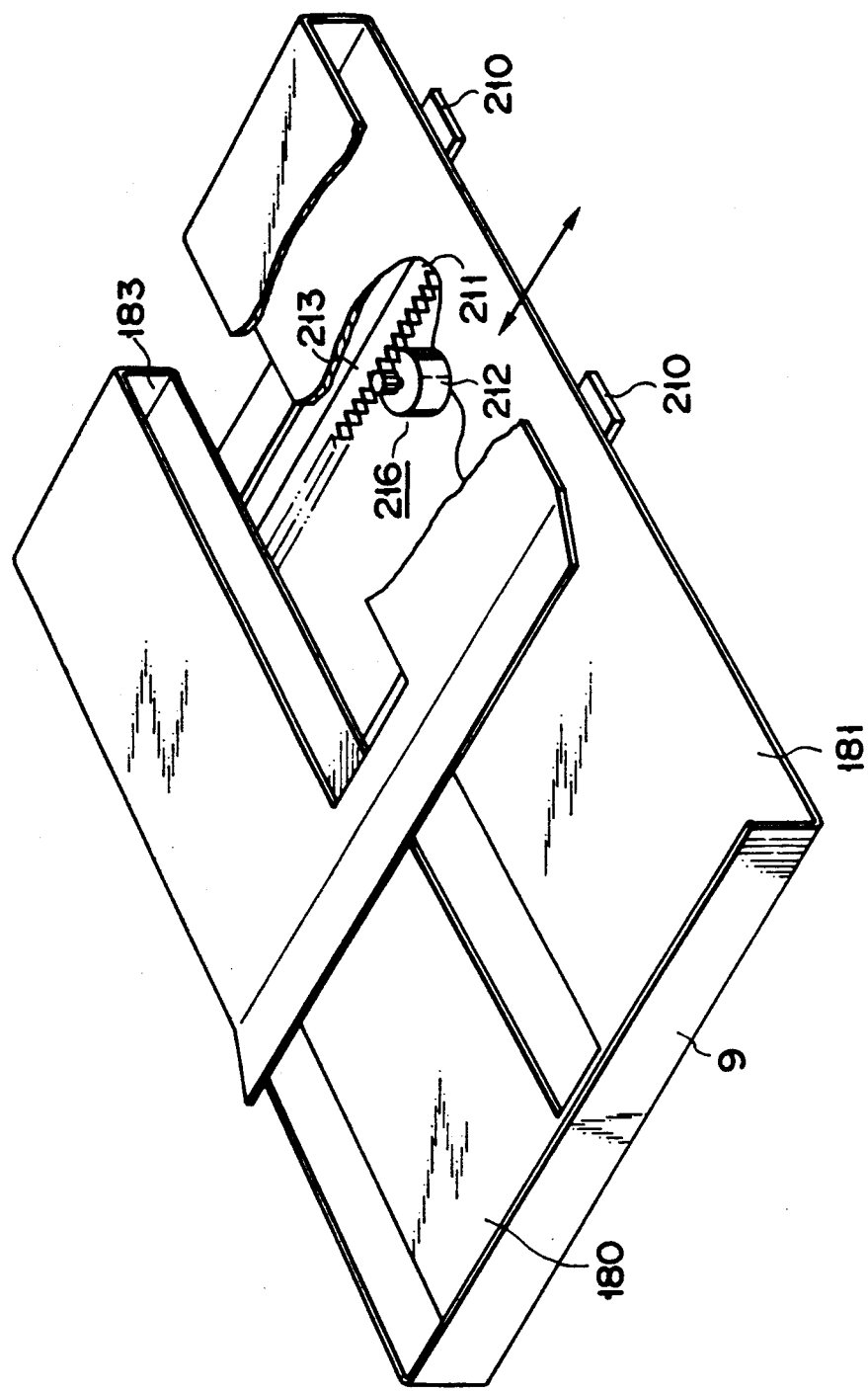

As is shown in FIGS. 7 and 8, discharge tray 9 is mounted on the inner bottom surface of lower unit 1b of main body 1 through a pair of slide rails 210 and can be movable back and forth, i.e., in a direction perpendicular to the feed direction of sheet P′. Rack 211 is mounted on the lower surface of tray 9 so as to be parallel to slide rails 210. Reversible motor 212 is mounted on the bottom of unit 1b and pinion 213 fixed to a drive shaft of motor 212 is meshed with rack 211. Rack 211 and motor 212 constitute tray moving means 216. Motor 212 is driven in accordance with a sort or grouping signal from operation panel 5, or an original discharge signal or a copy end signal from automatic original feed/discharge unit 4, so that tray 9 is moved by a predetermined distance.

As is shown in FIGS. 1 and 5, opening 220 is formed in that part of the front face of main body 1 which face movable discharge tray 9. Tray 9 can project beyond the front face of main body 1 through opening 220.

Spacers 214 and 215 are interposed between the bottom surface of tray 9 and slide rails 210 and rack 211, as is shown in FIG. 8, so as to prevent rails 210 and rack 211 from interfering with rack 184 and the like mounted on stopper 182.

The operation of the electronic copying machine having the above mentioned arrangement will be described.

As is shown in FIG. 2, after a plurality of originals D are placed on feed table 100 such that image surfaces thereof face down, operation panel 5 is manipulated so as to actuate automatic original feed/discharge unit 4. Then, as is shown in FIGS. 9A and 10A, original pickup roller 101 is rotated to pick up lowermost original D from the feed table. This original D is fed to original port 82 upon rotation of feed roller 107 and registration roller 105. At this time, platen sheet 83 is kept at the upper position upon operation of actuator 89 of drive mechanism 84 and is separated from original table glass plate 3. Rollers 93 are in contact with glass plate 3. Gates 106 and stopper 104 are kept in the lower positions so as not to interfere with movement of original D.

Figure 9C:
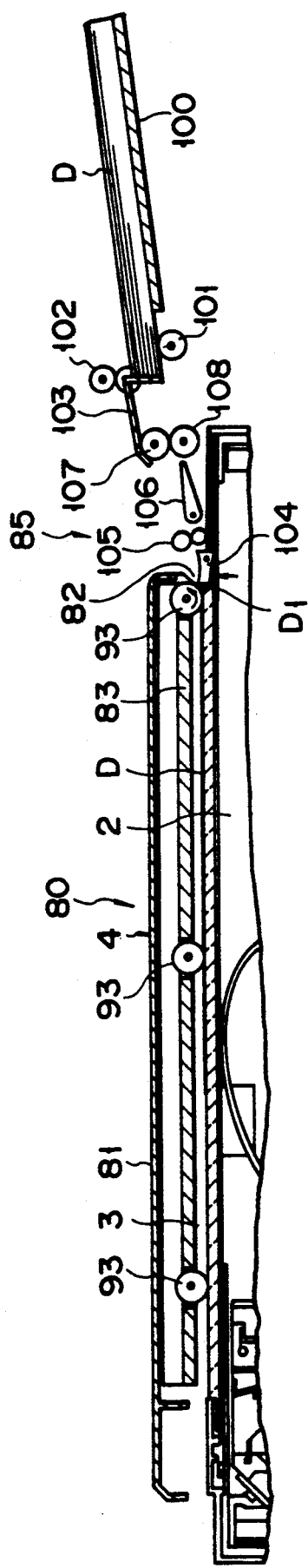
Figure 10A:
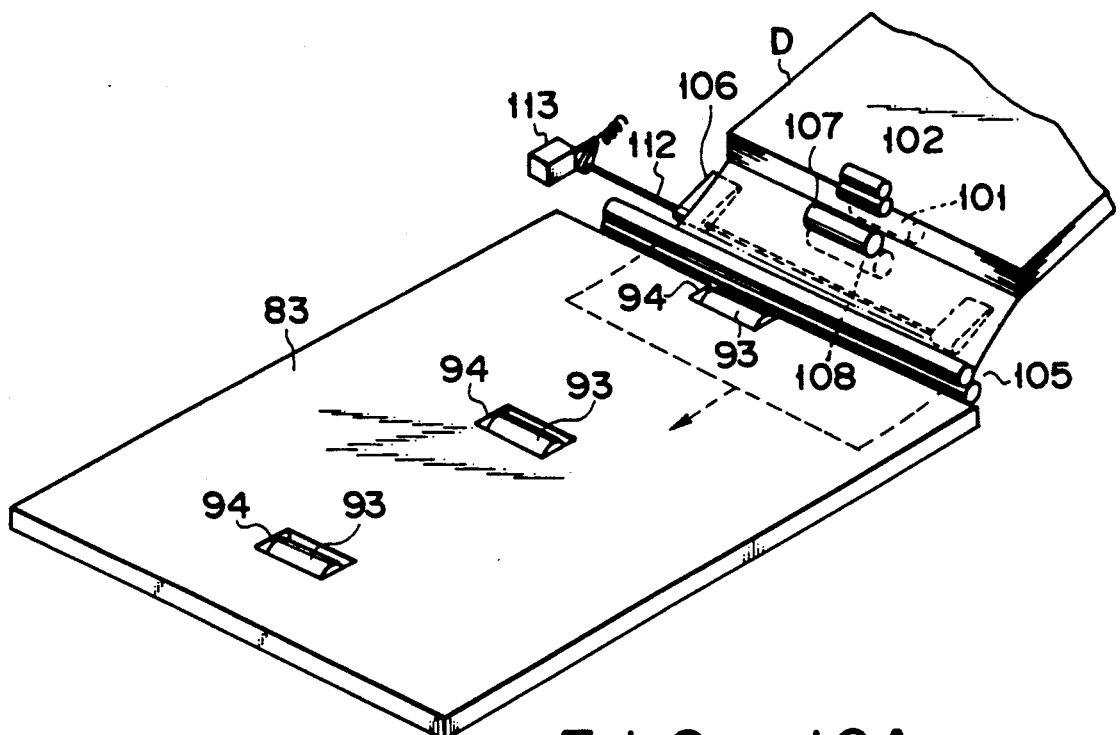
FIGS. 10A and 10B are perspective views showing original feed steps in the feed/discharge unit.
Figure 10B:
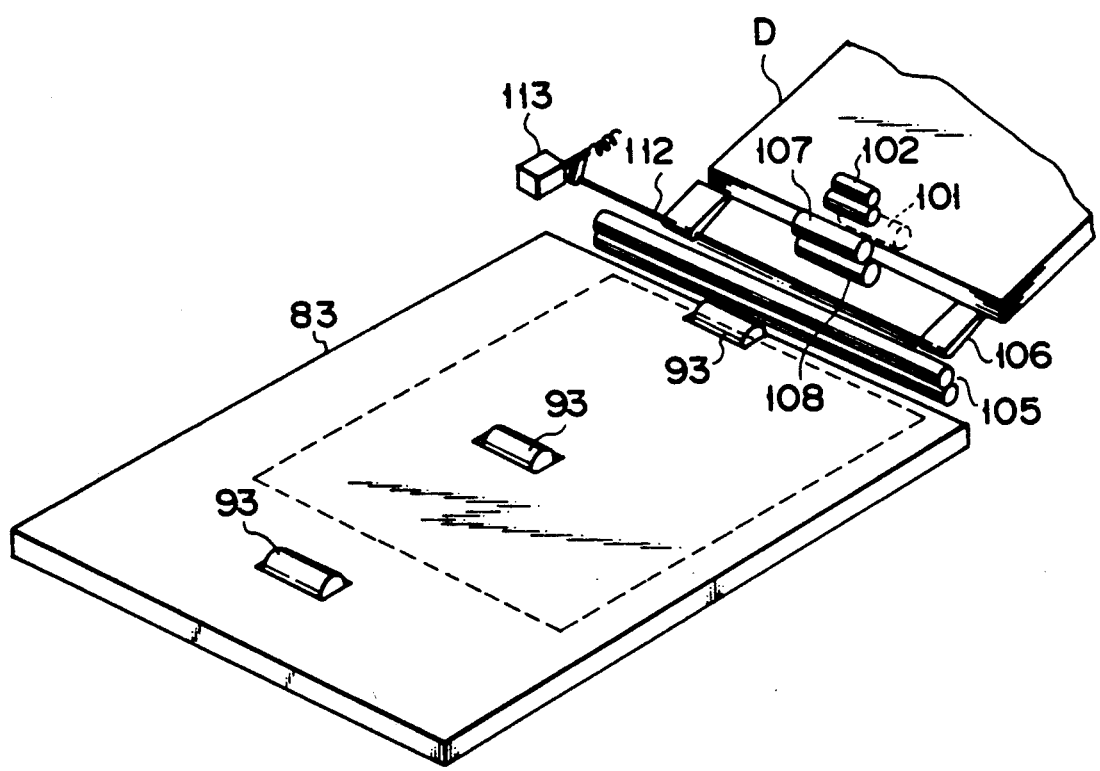
Figure 11A:
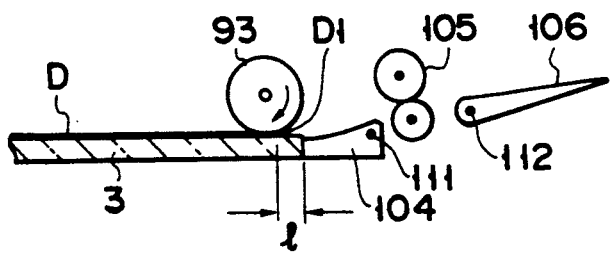
FIG. 11A is a sectional view showing a state wherein the stopper is moved to a lower position.
Figure 11B:
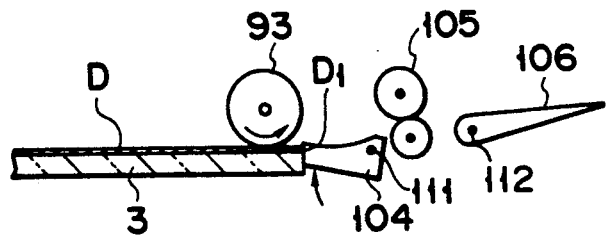
FIG. 11B is a sectional view showing a state wherein the stopper is moved to an upper position.

Original D introduced into cover 81 through original port 82 is moved forward upon rotation of rollers 93, as is shown in FIG. 9B. As is shown in FIG. 11A, when trailing end D1 of original D is reaches at a position advanced from the end face of stopper 104, stopper 104 is moved to its upper position. At the same time, the rotational direction of 96 motor is switched, so that rollers 93 are rotated in the reverse direction. As is shown in FIGS. 9C, 10B, and 11B, when original D is moved backward by distance l by means of rollers 93, trailing end D1 abuts against stopper 104 and original D is positioned.

Figure 12:
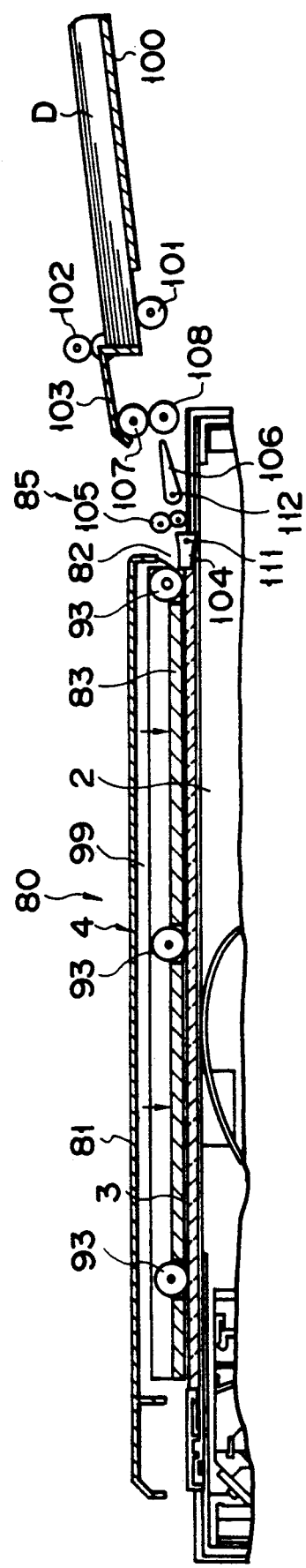

As is shown in FIG. 12, then rollers 93 are stopped and platen sheet 83 is moved downward, so that original D is urged against the upper surface of original table glass plate 3 by platen sheet 83. Therefore, original D can be accurately set at a predetermined position on glass plate 3.

While original D is set as described above, photosensitive drum 15 is rotated and uniformly charged by charging unit 16. First and second carriages 54 and 55 are moved from the left to the right in FIG. 2 along the lower surface of original table glass plate 3 while exposure lamp 46 is kept on. Therefore, original D on glass plate 3 is scanned, and photosensitive drum 15 is subjected to slit exposure. Thus, a latent image corresponding to original D is formed on drum 15. The latent image on drum 15 is visualized by upper or lower developing unit 58 or 59 of developing unit 19.

In synchronism with formation of the toner image, sheet P automatically picked up from upper or lower cassette 6 or 7 or large-capacity sheet feed unit 8, or sheet P manually inserted from manual feed table 14 is fed to image transfer section 25 through aligning rollers 28. The toner image formed on drum 15 is transferred to sheet P by transfer unit 20. Then, sheet P is fed to fixing unit 29 through conveyor belt 77 while being separated from drum 15 by separating unit 21. In fixing unit 29, the developing agent is melted and fixed on sheet P. Fixed sheet P' is fed in U-turn convey path 10 of sheet feed-out unit 11 by discharge rollers 26. At the same time, sheet P' is deelectrified by brush 79. After the toner image is transferred to sheet P, drum 15 opposes cleaning unit 22 so that a residual developing agent (i.e., residual toner) is removed from drum 15 by cleaning blade 63. Drum 15 then opposes deelectrifying unit 23, so that drum 15 is irradiated with light to remove an electrostatic memory. Therefore, photosensitive drum 15 is ready for the next copying cycle.

Figure 14:
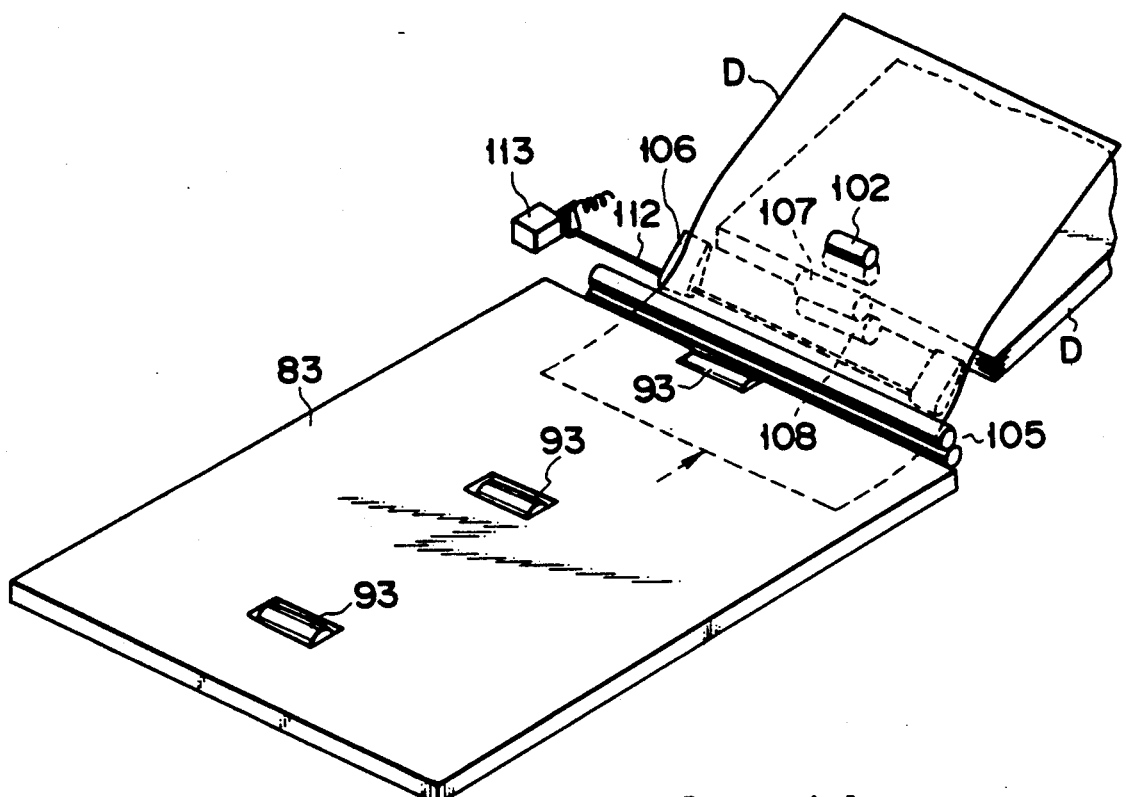
Figure 13B:
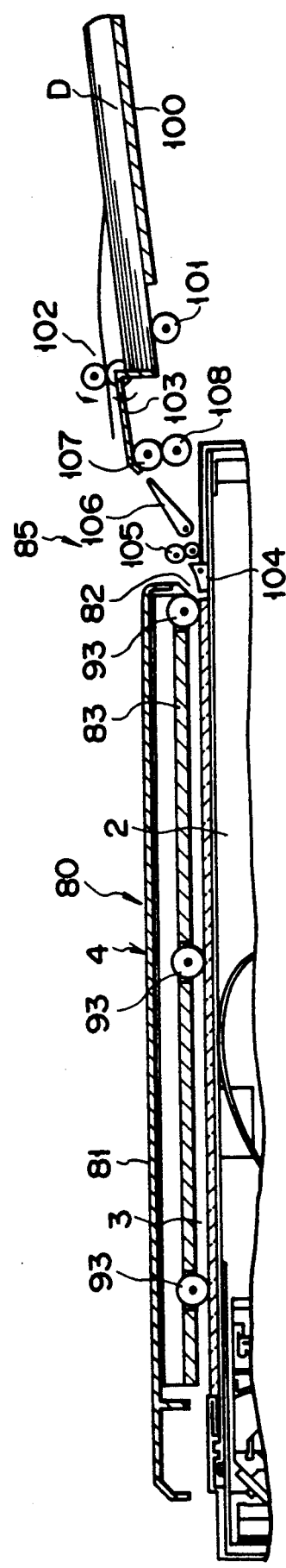

As is shown in FIG. 13A, after original D is scanned on original table glass plate 3, sheet drive mechanism 84 is operated to move platen sheet 83 upward. At the same time, rollers 93 are rotated counterclockwise while contacting with original D. Stopper 104 is then moved again downward to its lower position, while gates 106 are rotated to their upper position. As is shown in FIGS. 13A, 13B, and 14, thus, original D is transferred in a direction opposite to the feed direction as described above, and discharged on originals D stacked on feed table 100 through registration rollers 105, gates 106, guide 103, and discharge rollers 102.

By repeating a cycle in an order of feeding, scanning, and discharge, all originals D placed on feed table 100 are sequentially fed on original table glass plate 3 and scanned. Scanned originals D are sequentially stacked on feed table 100.

Fixed sheets P' discharged from main body 1 are stacked on discharge tray 9 in the following manner.

Figure 15A:
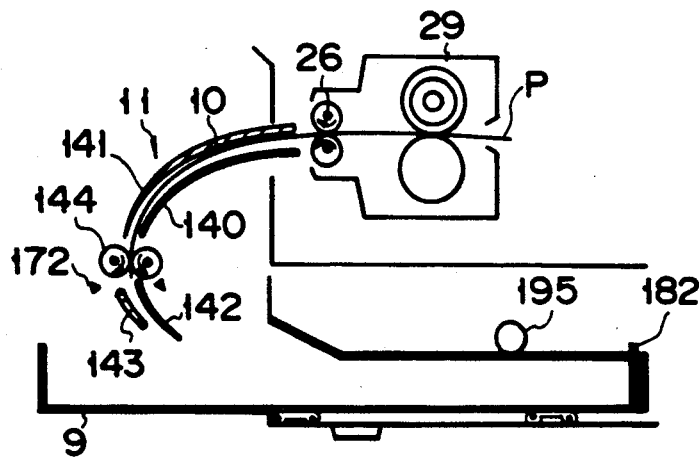
FIGS. 15A to 15E are sectional views showing sheet discharge steps in the sheet discharge unit.
Figure 15B:
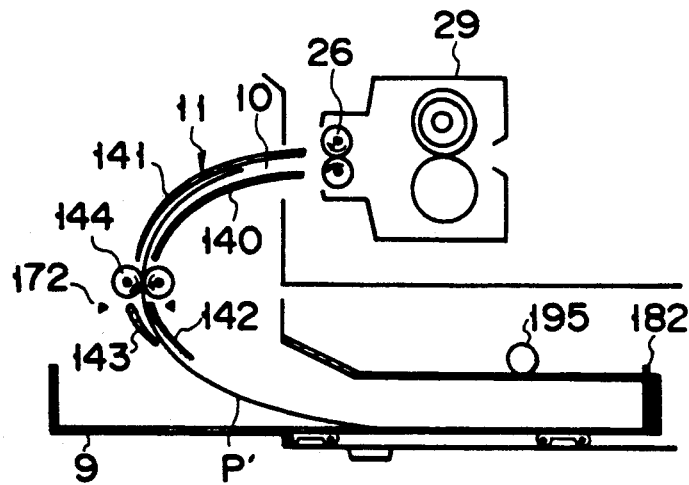
Figure 15C:
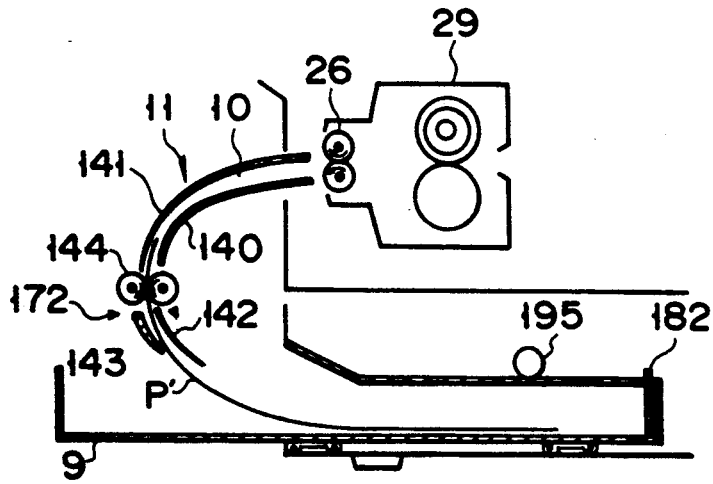
Figure 15D:
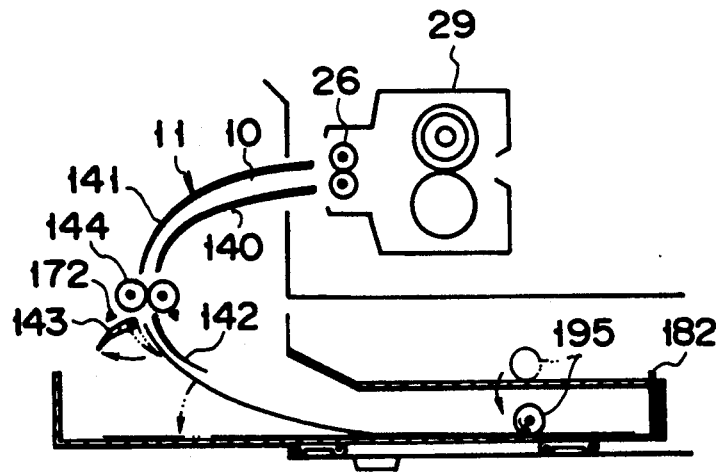
Figure 15E:
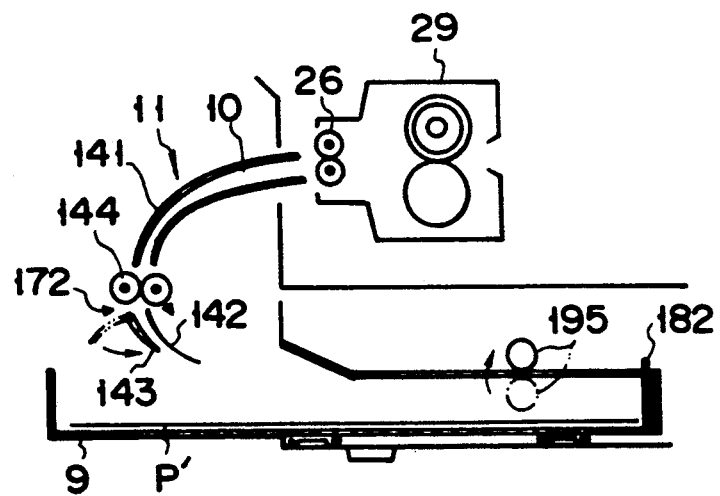

A drive signal is previously supplied to stopper moving means 187 in sheet feed-out unit 11, and stopper 182 is set at a predetermined position in accordance with the size of sheet P'. As is shown in FIG. 15A, sheet P' which has passed through fixing unit 29 is fed by discharge rollers 26 into U-turn convey path 10, i.e., a path between first and second fixed guides 140 and 141. Thereafter, sheet P' is fed in a path between movable guide 143 and third fixed guide 142 through convey means 144. Then, sheet P' is fed in discharge tray 9 by convey means 144 via states shown in FIGS. 15B and 15C. At this time, by passing through U-turn convey path 10, sheet P' is reversed, i.e., the image formation surface of sheet P' faces down. As is shown in FIG. 15D, when the trailing end of sheet P' is detected by sheet detector 172, solenoid 163 of movable guide actuating means 164 is operated so as to rotate guide 143 to its second position separated from third fixed guide 142. For this reason, the trailing end of sheet P' supported by movable guide 143 immediately fall on the bottom of tray 9 by elasticity of the sheet itself, as indicated by two dots and dashed line. At this time, as is shown in FIG. 15D, feed roller 195 of sheet feed mechanism 190 is in rolling contact with sheet P' and rotated. Thus, feed roller 195 feeds sheet P' until the leading end of sheet P' abuts against stopper 182. As is shown in FIG. 15E, when a predetermined period of time has elapsed after the trailing end of sheet P' is detected by sheet detector 172, i.e., when a period of time, sufficient for the leading end of sheet P' to abut against stopper 182, has elapsed, movable guide 172 returns to the first position where it opposes third fixed guide 142. At the same time, feed roller 195 returns to the position where it does not interfere feeding of the next sheet P.

Figure 16A:
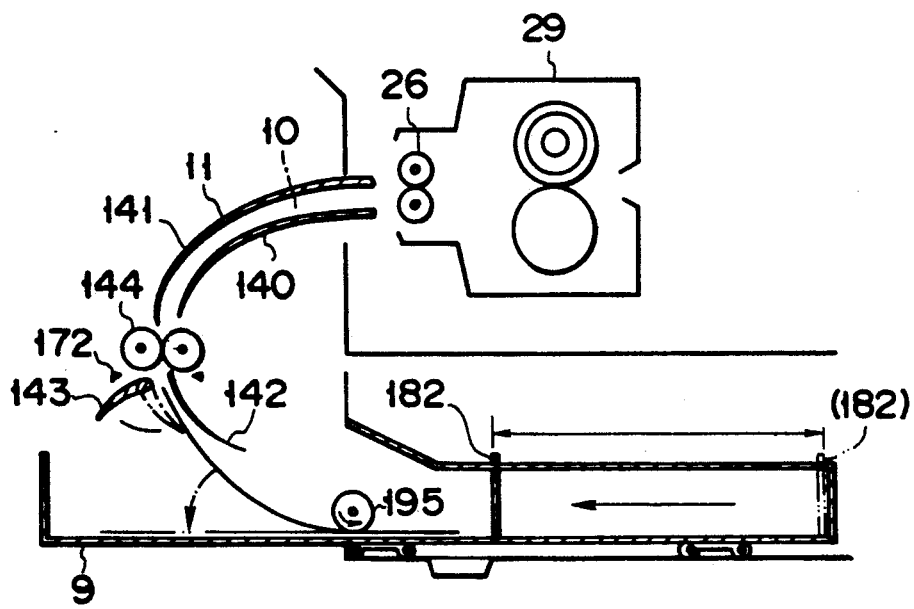
FIG. 16A is a sectional view of the sheet discharge unit and the discharge tray in a state wherein a movable guide is open and a sheet having small size is used.
Figure 16B:
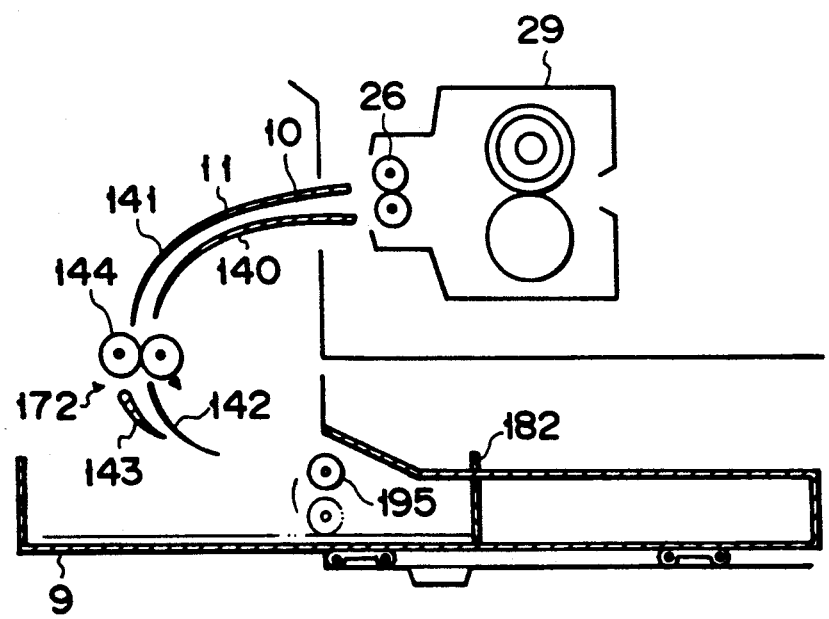
FIG. 16B is a sectional view of the sheet discharge unit and the discharge tray in a state wherein the movable guide is closed.

If the size of sheet P to be stacked on discharge tray 9 is smaller than that in the above case, a drive signal is supplied to stopper moving means 187 in accordance with this small sheet size. As is shown in FIGS. 16A and 16B, stopper 182 is moved to the left in FIGS. 16A and 16B and is automatically set at a position corresponding to the size of sheet P'. Thereafter, the same stacking operations as in FIGS. 15A to 15E are performed, and sheets P' are aligned and stacked on discharge tray 9.

Figure 17:
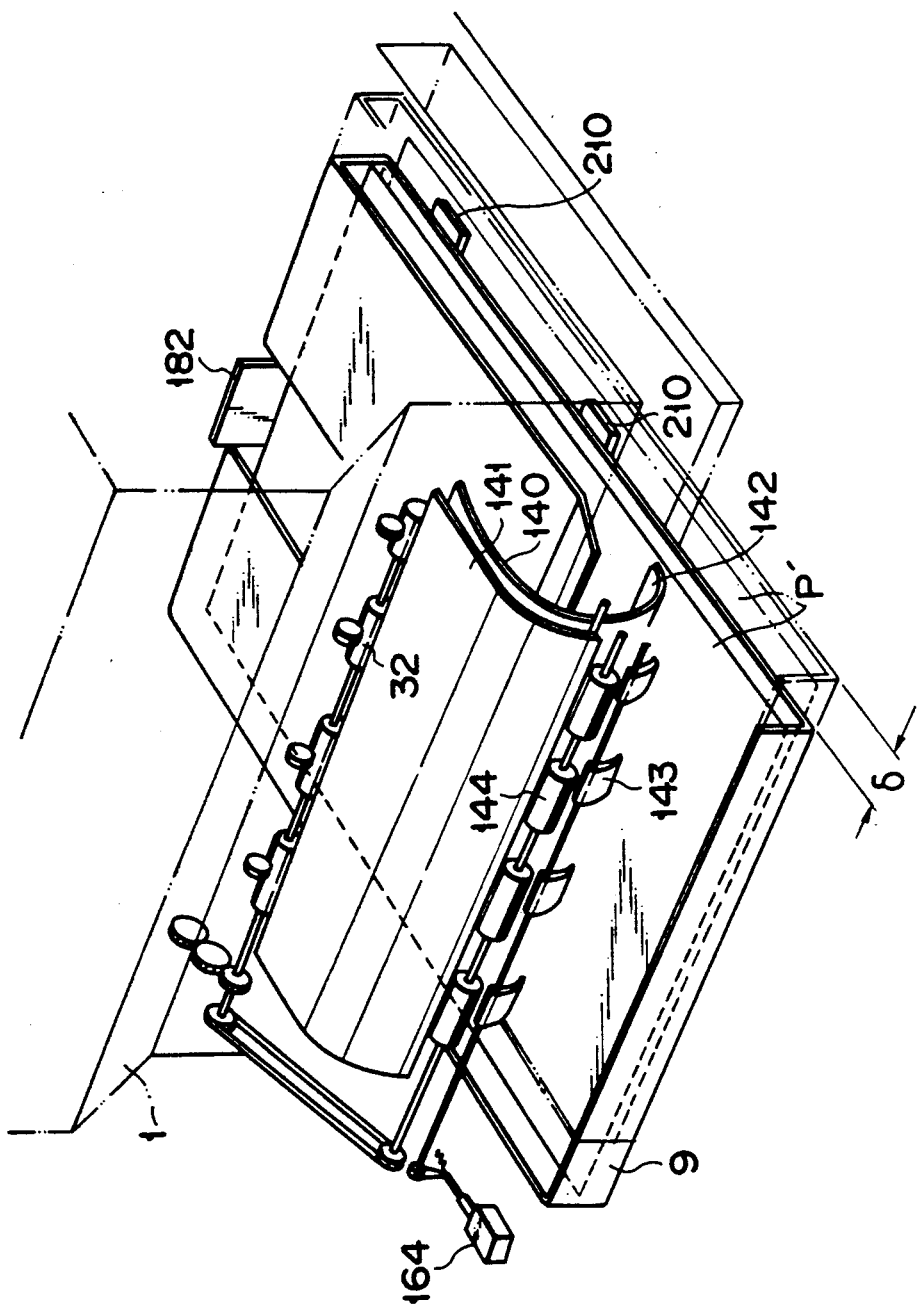
Figure 18:
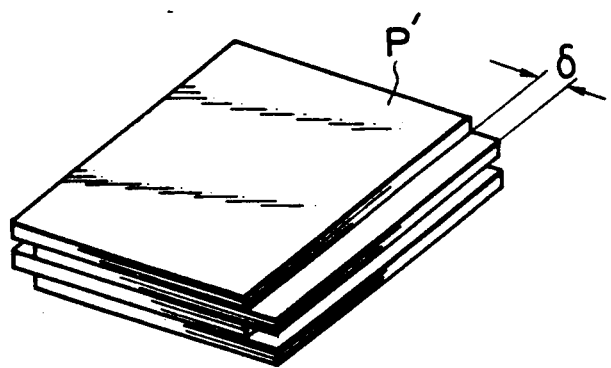

Gathering of sheets P' stacked on tray 9 is to be performed as needed. In this case, a gathering mode (sort mode) is set at operation panel 5. At the same time, the number of originals D set on original feed table 100 of feed/discharge unit 4, and the number of sets of copies are input. Thus, tray moving means 216 is set to operate in the sort mode. As is shown in FIG. 17, whenever an image formation cycle is completed, i.e., copying of one set of copies is completed, discharge tray 9 is moved by distance δ by tray moving means 216. Therefore, as is shown in FIG. 18, sheets P' having images are stacked on tray 9 with being offset by distance δ in a direction perpendicular to the sheet feed direction in units of sets of copies. Originals D discharged from original table glass plate 3 are stacked again on originals D on original feed table 100. Automatic feeding and discharging of original D are repeated until copying of the preset number of sets is completed.

Figure 19:
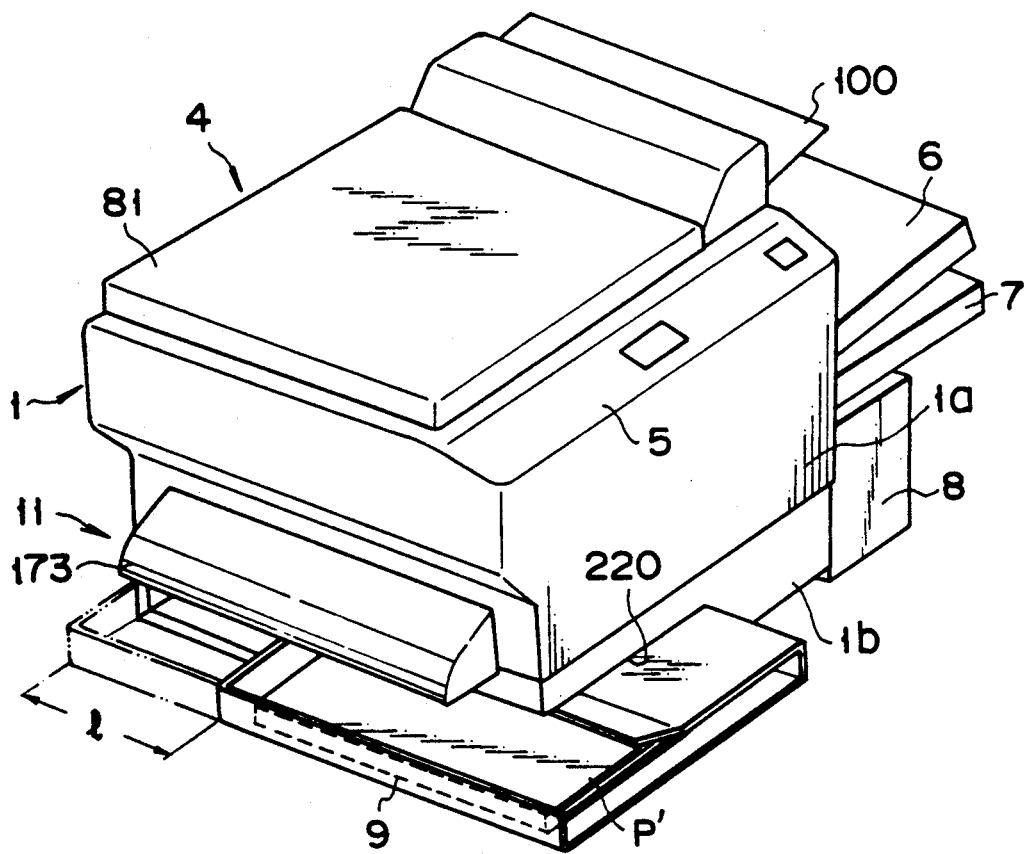

When copying is completed as described above, a signal for moving discharge tray 9 forward is input to tray moving means 216. Thus, as is shown in FIG. 19, tray 9 is moved forward by distance l beyond the front face of main unit 1 through opening 220. Therefore, sheets P' in tray 9 can be easily taken out.

In the structure wherein convey means 144 for conveying sheet P is arranged midway along U-turn convey path 10, sheet P' can be properly fed into discharge tray 9 while sheet P' is held in a curved state and has a large convey resistance.

With the copying machine having the arrangement described above, the automatic original feed/discharge unit has vertically movable platen sheet 83. This platen sheet is moved upward and separated from the glass plate when an original is fed onto and discharged from the glass plate. Thus, the original on the glass plate can be easily moved upon rotation of only feed rollers 93. For this reason, unlike in the conventional apparatus wherein a large endless belt in sliding contact with the original table glass plate is driven, the drive mechanism can be made compact and simplified. Therefore, unit body 80 which is opened and closed integral with cover 81 can be lightweight, so that the cover can be easily opened and closed. As compared with the apparatus using an endless belt, feeding of the original can be easily stabilized. In addition, since platen sheet 83 does not slide on the original table glass sheet but is vertically moved with respect to the glass plate, the original contact surface of the platen sheet tends not to be contaminated.

Feed table 100 and stopper 104 are arranged together on one side of main body 1. For this reason, trailing end D1 of original D fed from feed table 100 onto original table glass plate 3 can immediately abut against the stopper, and the original can be quickly positioned. After the original is scanned, it is transferred in a direction opposite to the feed direction of the original and discharged onto feed table 100. For this reason, unlike in the conventional apparatus, the original need not be moved from one end to the other end of the original table glass plate. The original convey path required for feeding, scanning, and discharging can be shortened. Therefore, the original can be fed and discharged at high speed, and drive energy of the driving means can be reduced.

Sheet P' discharged from main body 1 is fed to and stacked on discharge tray 9 while sheet P' is kept reversed by U-turn convey path 10, i.e., while the image formation surface of sheet P' faces down. Therefore, sheets P' can be stacked on discharge tray 9 in an image formation order, and cumbersome page alignment need not be performed. Furthermore, tray 9 is partially incorporated in main body 1 at a position below discharge rollers 26. Therefore, tray 9 projects from main body 1 by a small distance, and the installation space for the apparatus can be made small. Tray 9 can be reciprocated in a direction perpendicular to the feed direction of sheet P' by the tray moving means. When a plurality of sets of copies are to be required, the tray can be moved every time copying of each set is completed. Therefore, sheets P' can be stacked on the tray while being completely gathered. As a result, an expensive large sorter need not be additionally arranged, thus greatly reducing cost.

In the above embodiment, copying can be performed without using automatic original feed/discharge unit 4 if so desired. That is, cover 81 is manually opened or closed, and an original is set at a predetermined position of glass plate 3.

Figure 20:
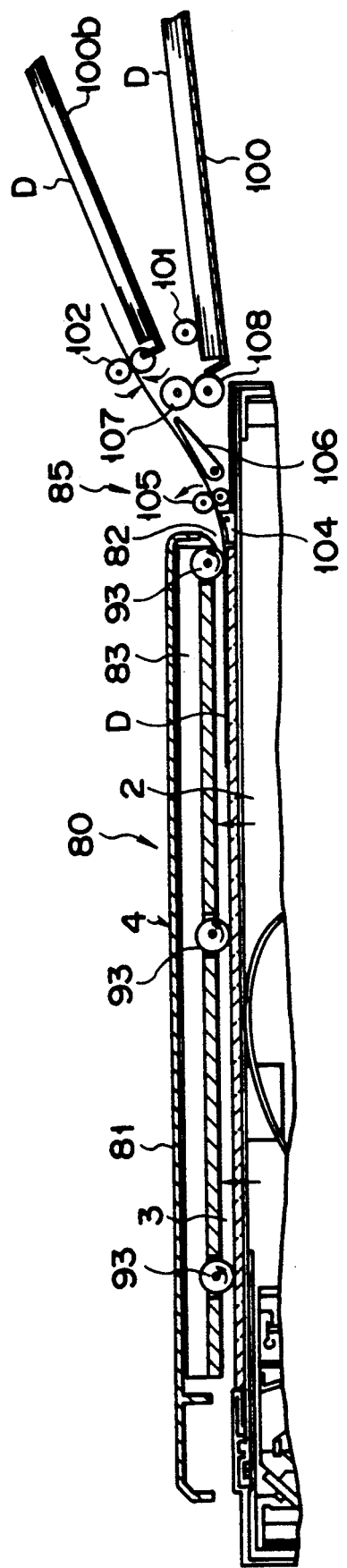
FIG. 20 is a sectional view showing a modification of the automatic original feed/discharge unit.
Figure 21:
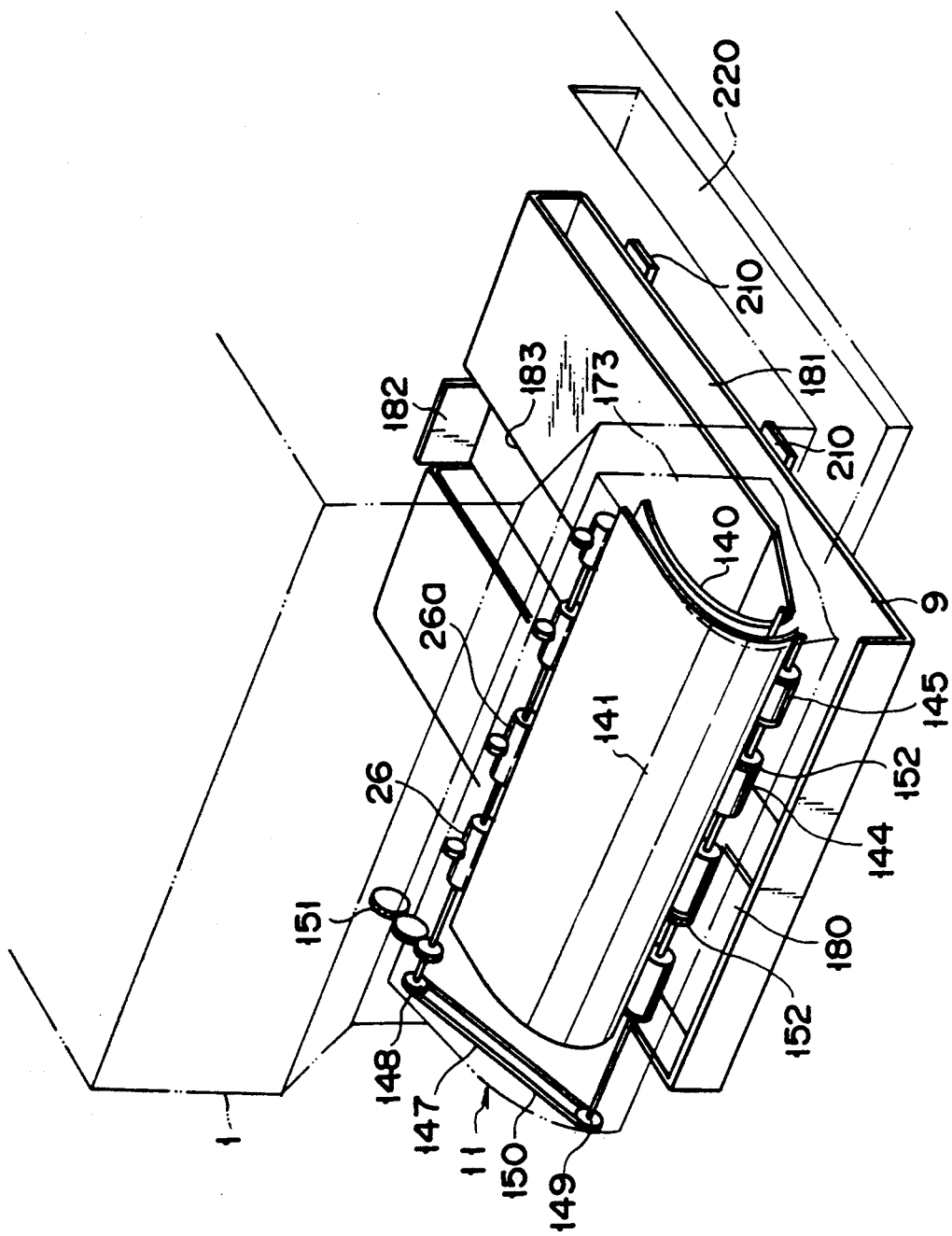

As is shown in FIG. 20, discharge table 100b may be arranged above feed table 100. The uppermost one of the originals stacked on the feed table may be supplied to glass plate 3 and then discharged onto the discharge table after scanning. In addition, the discharge table may be located at a side of cover 81 opposite to feed table 100, and original D may be fed in only one direction. In these cases, the automatic original feed/discharge unit can be simplified and lightweight, and at the same time, contamination of the platen sheet can be suppressed, as in the above embodiment.

FIGS. 21 to 24 show sheet feed-out unit 11 of a copying machine according to another embodiment of the present invention. Only parts different from the first embodiment will be described in detail. The same reference numerals as in the first embodiment denote the same parts, and a detailed description thereof will be omitted.

In the second embodiment, feed-out unit 11 comprises first and second fixed guides 140 and 141, and the third fixed guide and the movable guide are omitted. Convey means 144 comprising driving rollers 145 and driven rollers 146 which are in contact therewith is arranged at the end of U-turn convey path 10 defined between first and second fixed guides 140 and 141. Rollers 145 and 146 have a sheet feed direction opposite to the feed direction of discharge rollers 26 and inclined by angle θ (about 40 degrees) with respect to the bottom of discharge tray 9. Caterpillar 152 having a diameter larger than that of roller 145 is wound around the surface of each driving roller 145 at a portion which is not in contact with corresponding driven roller 146.

Figure 24:
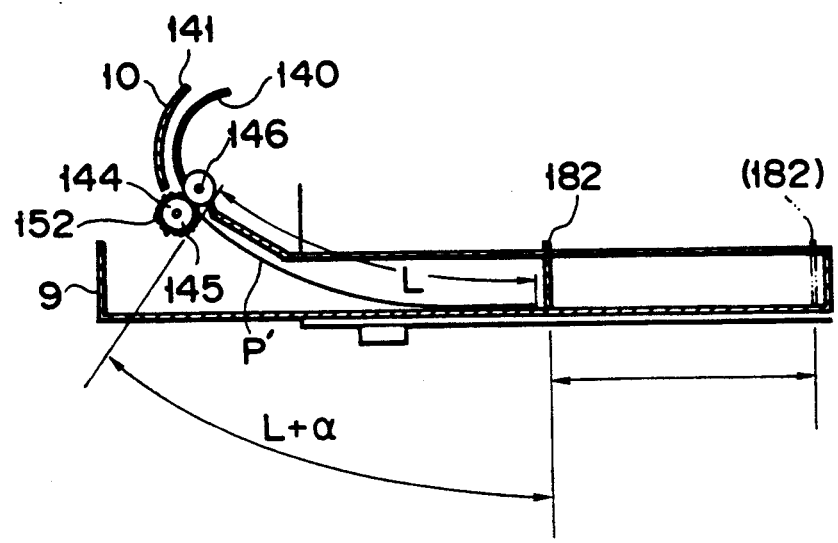

The distal end of the upper plate of discharge tray 9 extends near driven rollers 146. As is best illustrated in FIG. 24, stopper 182 is mounted on tray 9. Stopper 182 is automatically moved by stopper moving means 187 (FIG. 6) in accordance with the size of sheet P such that a distance between conveying means 144 and becomes (L+α) which is slightly longer than length L of sheet P by α. In this embodiment, sheet feed mechanism 190 of stopper 182 is omitted.

In sheet feed-out unit 11 having the above arrangement, sheet P' discharged by rollers 26 from main body 1 passes through U-turn convey path 10 and is then fed between driving rollers 145 and driven rollers 146. While sheet P' passes through U-turn convey path 10, it is reversed, so that its image forming surface faces down. As is shown in FIG. 24, sheet P' is then fed by rollers 145 and 146 into discharge tray 9. When the o trailing end of sheet P' is separated from rollers 145 and 146, i.e., in the state shown in FIG. 24, the trailing end of the sheet is kicked away by caterpillars 152 fixed to rollers 145. Therefore, the leading end of sheet P' abuts against stopper 182 and the trailing end of sheet P' immediately falls on the bottom surface of tray 9. Thus, sheets P' can be aligned and stacked in discharge tray 9.

When feed-out unit 11 having the above arrangement is used, the same effect as in the first embodiment can be obtained. Since the feed direction of convey means 144 arranged at the end of U-turn convey path 10 is opposite to that of discharge rollers 26, the sheet can be conveyed in a predetermined direction without arranging another fixed guide, a movable guide and the like on the downstream side of fixed guides 140 and 141. Therefore, the structure of sheet feed-out unit 11 can be simplified. In addition, since sheet feed mechanism 190 of stopper 182 can also be omitted, the structure of the apparatus as a whole can be further simplified.

In the first embodiment, unit body 80 of automatic original feed/discharge unit 4 is constructed such that the whole part of platen sheet 83 is lifted by sheet drive mechanism 84. However, unit body 80 may be constructed so as to lift only part of platen sheet 83, i.e., that portion of platen sheet 83 which is located near feed/discharge mechanism 85. In this case, as is shown in FIG. 25, drive shaft 90 is provided only at that portion of platen sheet 83 which is located near feed/discharge mechanism 85. Shaft 90 is connected to plunger 89b through cam 91a and to bent portions 88a of platen sheet 83 through cams 91b. An end portion of platen sheet 83 which is opposite to mechanism 85 is rotatably supported by cover 81 through support shaft 90b.

When drive mechanism 84 is actuated, the right end portion of platen sheet 83 is lifted by cams 91b and platen sheet 83 is rotated about support shaft 90b, as is shown in FIGS. 25 and 26. Thus, the lower surface of platen sheet 83 is separated from original table glass plate 3.

With this embodiment having the above arrangement, the same advantages as in the first embodiment can be obtained.

What is claimed is:

1. An image forming apparatus comprising:
   a main body having an original table surface on which an original is to be placed;
   scanning means, arranged inside said main body, for scanning he original placed on said original table surface; and
   an automatic original feeder including an original cover arranged above the original table surface to be movable between a lower position where said original cover is in contact with said original table surface, to press the original toward said original table surface, and an upper position where said original cover is away from said original table surface, said original cover having one end portion which is located at a downstream side of the feeding direction of the original and being rotatable between said upper and lower positions about said one end portion, feeding means for feeding the original to said original table surface, original cover drive means for moving said original cover to the upper position when the original is to be fed onto said original table surface, a feed roller arranged to contact said original table surface, and roller drive means for driving said feed roller to feed the original, fed by said feeding means, to a predetermined position on said original table surface.

2. An apparatus according to claim 1, wherein said automatic original feeder includes a cover mounted on said main body to be located above said original table surface, said one end portion of the original cover being rotatably supported by said cover.

* * * * *